(12) United States Patent  
Solheid et al.

(10) Patent No.: US 7,970,249 B2
(45) Date of Patent: Jun. 28, 2011

(54) FIBER OPTIC SPLICE ENCLOSURE

(75) Inventors: James J. Solheid, Lakeville, MN (US); Oscar Fernando Bran de León, Belle Plaine, MN (US); Steven C. Zimmel, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 64 days.

(21) Appl. No.: 12/370,040

(22) Filed: Feb. 12, 2009

(65) Prior Publication Data

US 2009/0252472 A1 Oct. 8, 2009

Related U.S. Application Data

(60) Provisional application No. 61/029,136, filed on Feb. 15, 2008, provisional application No. 61/039,045, filed on Mar. 24, 2008, provisional application No. 61/147,924, filed on Jan. 28, 2009.

(51) Int. Cl.
G02B 6/00 (2006.01)
(52) U.S. Cl. ........................................ 385/135; 385/134
(58) Field of Classification Search .................... 385/135
See application file for complete search history.

(56) References Cited

U.S. PATENT DOCUMENTS

| 4,805,979 A | 2/1989 | Bossard et al. |
| 5,071,220 A | 12/1991 | Ruello et al. |
| 5,133,039 A | 7/1992 | Dixit |
| 5,313,546 A | 5/1994 | Toffetti |
| 5,479,533 A | 12/1995 | Tanaka |
| 5,495,549 A | 2/1996 | Schneider et al. |
| 5,631,993 A | 5/1997 | Cloud et al. |
| 5,652,820 A | 7/1997 | Glaser et al. |
| 5,692,299 A | 12/1997 | Daems et al. |
| 5,754,723 A | 5/1998 | Fremgen |
| 5,754,724 A | 5/1998 | Peterson et al. |
| 5,778,122 A | 7/1998 | Giebel et al. |
| 5,790,739 A | 8/1998 | Strause |
| 5,790,740 A | 8/1998 | Cloud et al. |
| 5,790,741 A | 8/1998 | Vincent et al. |
| 5,825,964 A | 10/1998 | Goetter et al. |
| 5,862,290 A | 1/1999 | Burek et al. |
| 5,883,999 A | 3/1999 | Cloud et al. |
| 5,884,001 A | 3/1999 | Cloud et al. |
| 5,884,002 A | 3/1999 | Cloud et al. |

(Continued)

FOREIGN PATENT DOCUMENTS

DE 20 2005 011 461 U1 9/2005

(Continued)

OTHER PUBLICATIONS

International Search Report and Written Opinion mailed Jul. 6, 2009.

(Continued)

Primary Examiner — Rhonda S Peace
(74) Attorney, Agent, or Firm — Merchant & Gould P.C.

(57) ABSTRACT

Certain example embodiments of a splice enclosure include a housing defining an opening for allowing a trunk cable to be passed through the housing. The splice enclosure also includes a splice tray stack pivotally mounted within the housing and a cable management tray that mounts within the housing beneath the splice tray stack. The management tray includes cable retention and/or securement arrangements for mechanically securing the cables to the splice enclosure.

6 Claims, 31 Drawing Sheets

U.S. PATENT DOCUMENTS

| | | | |
|---|---|---|---|
| 5,884,003 A | 3/1999 | Cloud et al. | |
| 5,892,870 A | 4/1999 | Fingler et al. | |
| 6,226,434 B1 | 5/2001 | Koshiyama et al. | |
| 6,249,632 B1 | 6/2001 | Wittmeier, II et al. | |
| 6,275,639 B1 | 8/2001 | Bolt et al. | |
| 6,275,640 B1 | 8/2001 | Hunsinger et al. | |
| 6,411,767 B1 | 6/2002 | Burrous et al. | |
| 6,483,977 B2 | 11/2002 | Battey et al. | |
| 6,504,986 B1 | 1/2003 | Wambeke et al. | |
| 6,507,691 B1 | 1/2003 | Hunsinger et al. | |
| 6,539,160 B2 | 3/2003 | Battey et al. | |
| 6,542,688 B1 | 4/2003 | Battey et al. | |
| 6,621,975 B2 | 9/2003 | Laporte et al. | |
| 6,766,094 B2 | 7/2004 | Smith et al. | |
| 6,797,878 B1 | 9/2004 | Radelet | |
| 6,798,967 B2 | 9/2004 | Battey et al. | |
| 6,815,612 B2 * | 11/2004 | Bloodworth et al. | 174/50 |
| 6,856,748 B1 | 2/2005 | Elkins, II et al. | |
| 7,013,074 B2 | 3/2006 | Battey et al. | |
| 7,239,789 B2 * | 7/2007 | Grubish et al. | 385/135 |
| 7,340,145 B2 | 3/2008 | Allen | |
| 7,493,003 B2 * | 2/2009 | Kowalczyk et al. | 385/135 |
| 2007/0104447 A1 | 5/2007 | Allen | |
| 2008/0170832 A1 | 7/2008 | Mullaney et al. | |
| 2009/0058018 A1 | 3/2009 | Mullaney et al. | |
| 2009/0060440 A1 | 3/2009 | Wright et al. | |

FOREIGN PATENT DOCUMENTS

| | | |
|---|---|---|
| WO | WO 03/040774 A2 | 5/2003 |

OTHER PUBLICATIONS

Tyco Electronics brochure titled *A World of Fiber*, Jul. 2008 (8 pages).

Tyco Electronics brochure titled *IFDB-M: Indoor Fiber Distribution Box*, Jun. 2008, (2 pages), available at http://www.telecomosp.pl/pdf/ifdb-m_tc1038_ang.pdf (obtained Nov. 16, 2010).

Photographs showing the fiber distribution box labeled IFDB-M in the Tyco Electronics brochures listed above (5 pages).

* cited by examiner

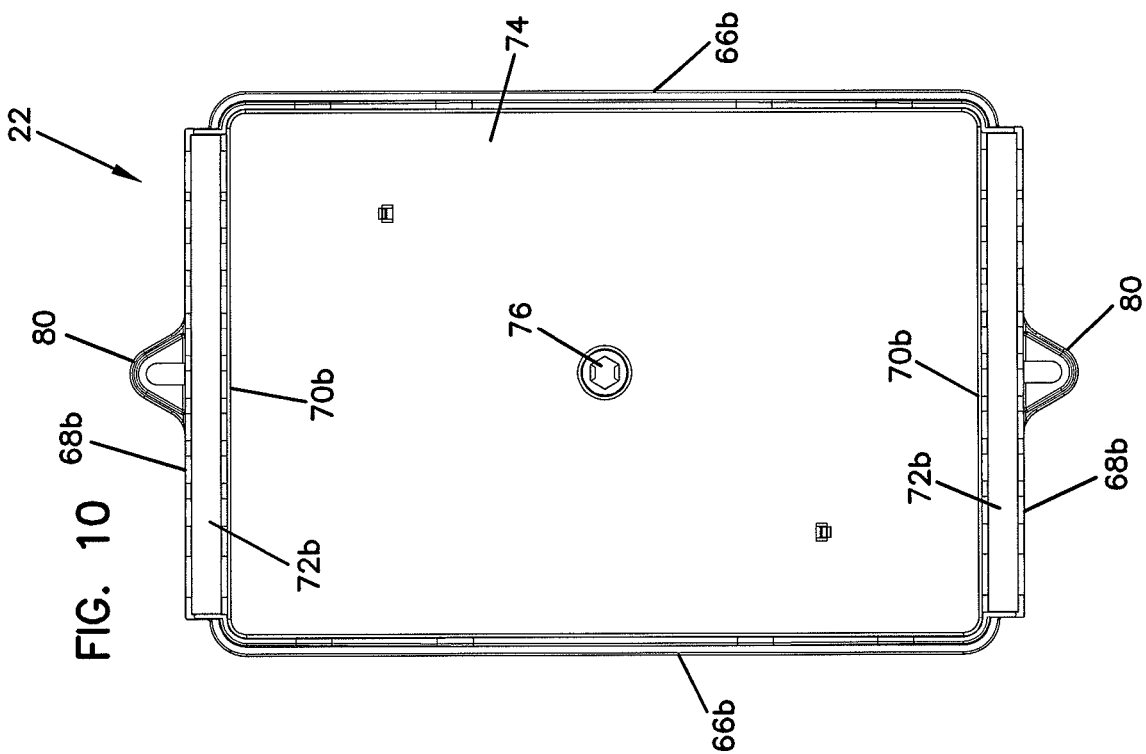
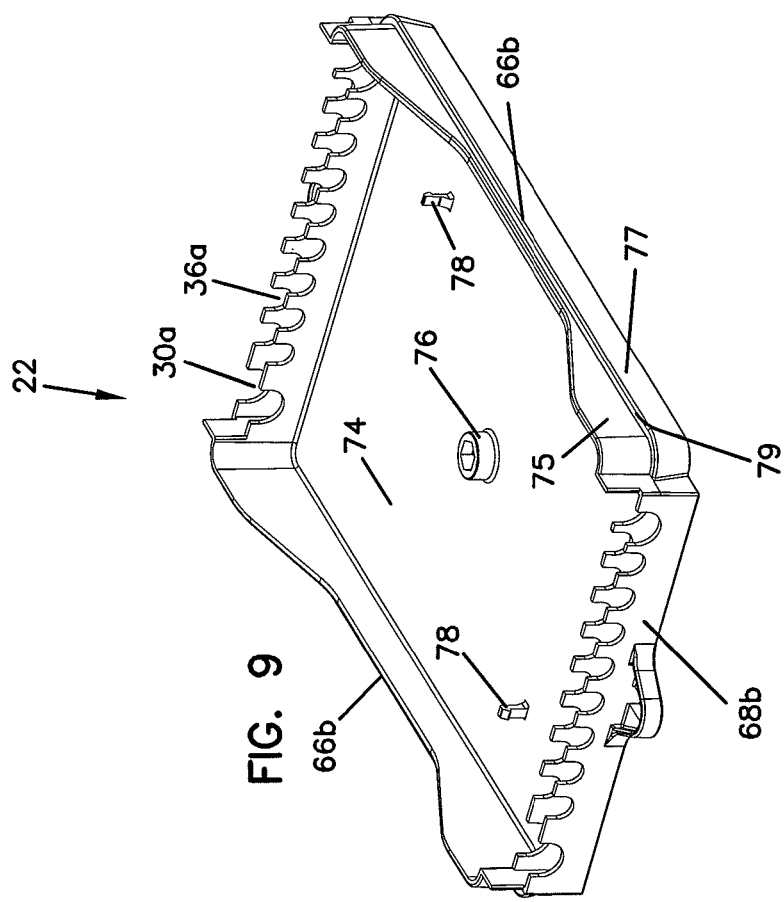

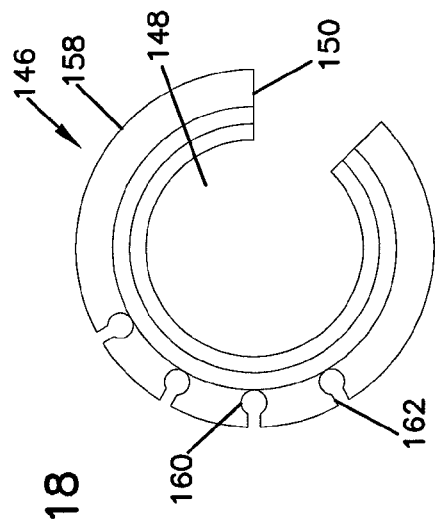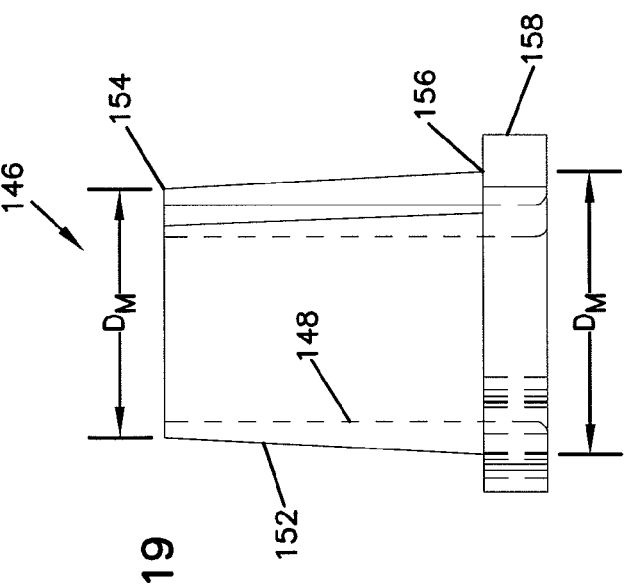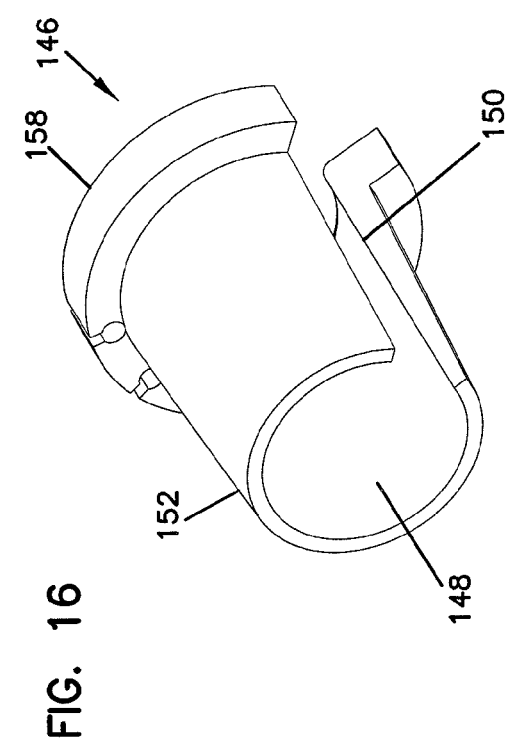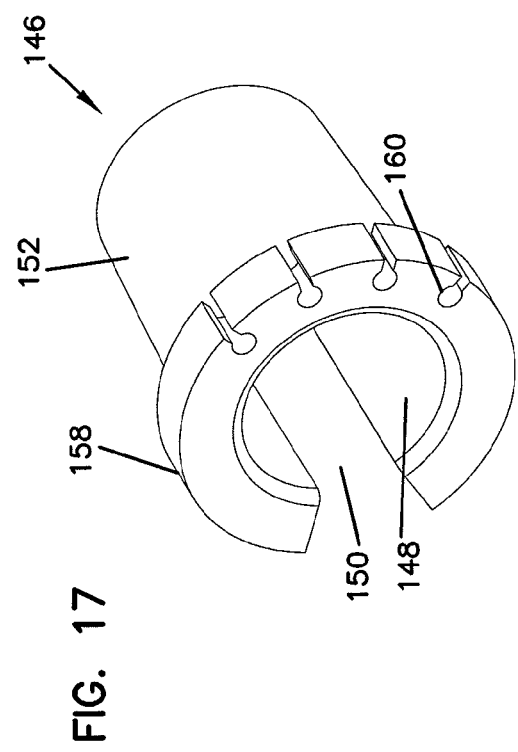

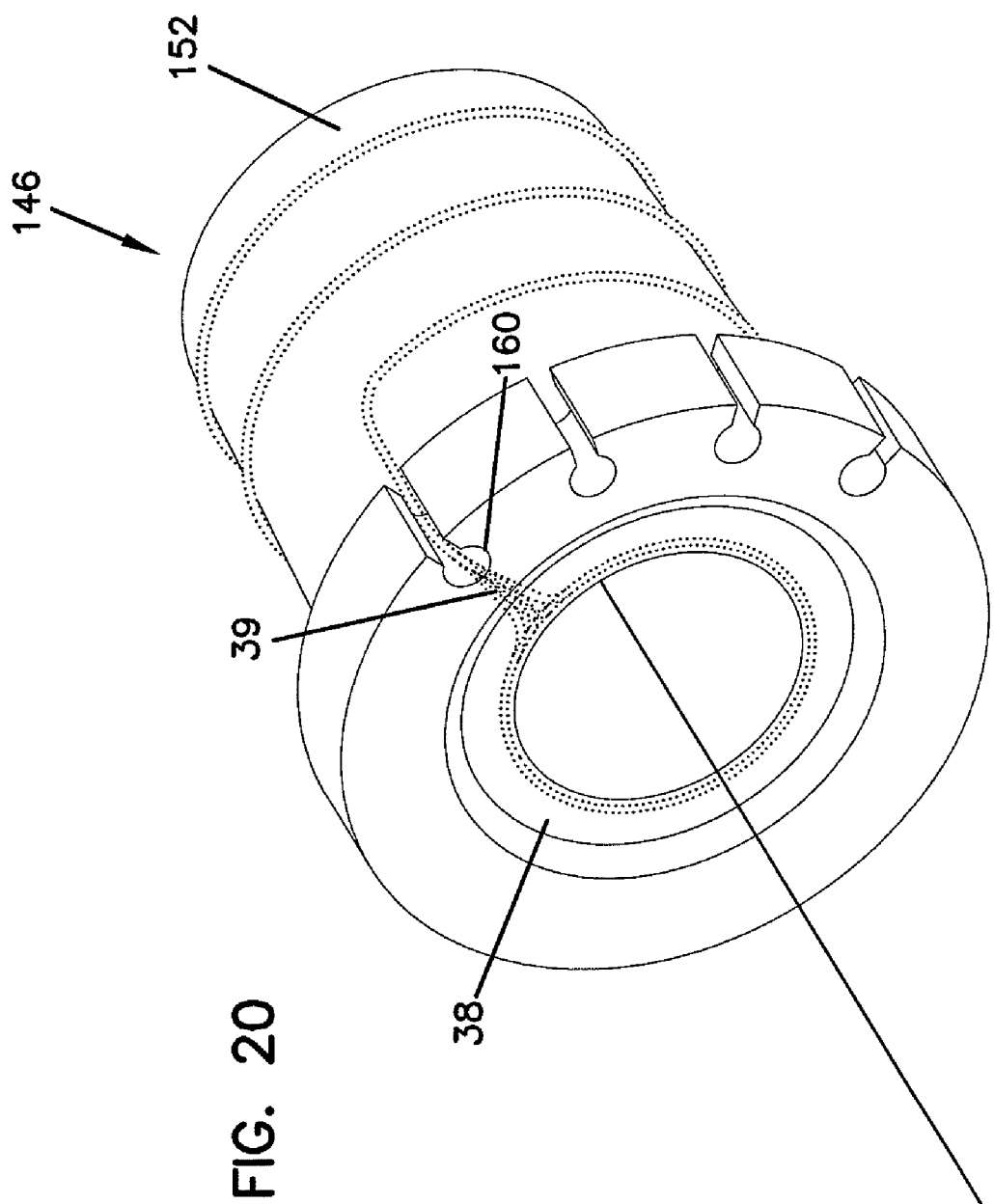

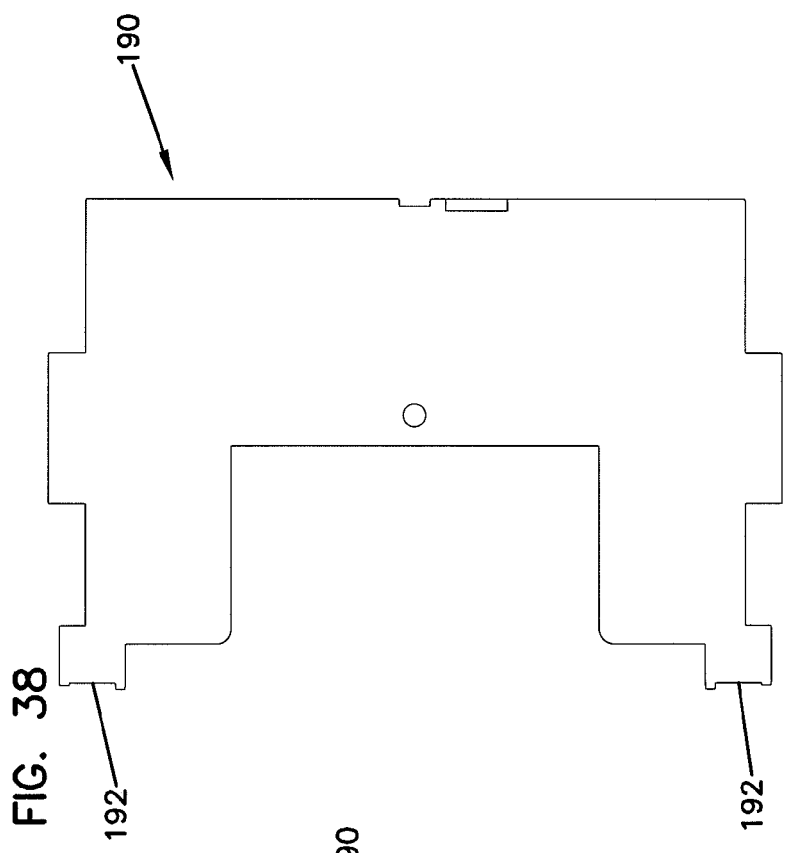
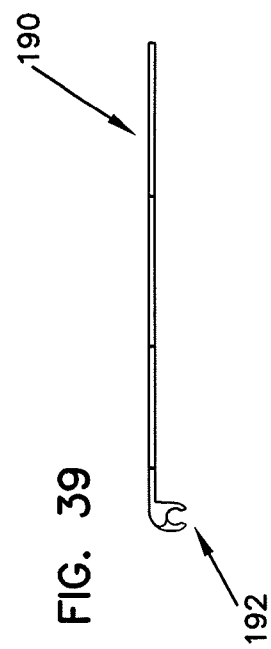
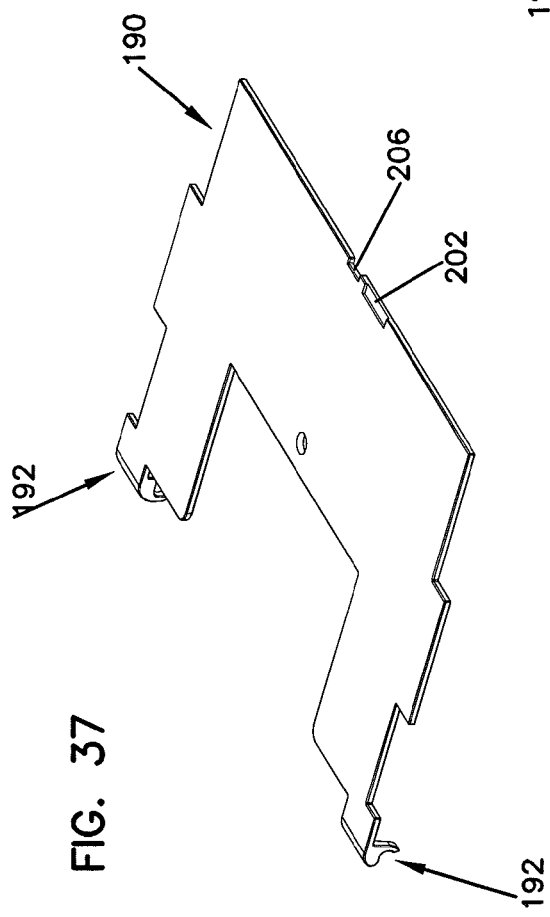

FIBER OPTIC SPLICE ENCLOSURE

CROSS REFERENCE

This application claims priority from provisional application Ser. No. 61/029,136, filed Feb. 15, 2008; provisional application Ser. No. 61/039,045, filed Mar. 24, 2008; and provisional application Ser. No. 61/147,924, filed Jan. 28, 2009, and which applications are incorporated herein by reference.

TECHNICAL FIELD

The present disclosure relates generally to telecommunications components. More particularly, the present disclosure relates to splice enclosures for use in fiber optic telecommunications systems.

BACKGROUND

Passive optical networks are becoming prevalent in part because service providers want to deliver high band width communication capabilities to customers. Passive optical networks are a desirable choice for delivery high-speed communication data because they may not employ active electronic devices, such as amplifiers and repeaters, between a central office and a subscriber termination. The absence of active electronic devices may decrease network complexity and/or costs and may increase network reliability.

Fiber optic telecommunications systems can include a fiber optic network including distribution cables for connecting a central office to a plurality of end subscribers. A distribution cable network often includes a main or trunk cable including a plurality of fibers, and a plurality of branch cables (e.g., drop cables) that are spliced to corresponding fibers of the trunk cable and that are routed to locations such as a subscriber locations or drop terminals. Splice enclosures can be used to protect the region of the distribution cable where the branch cable or cables are spliced to the trunk cable. It is desirable for fiber optic splice enclosures to be easy to use, to provide effective cable management, and to provide effective retention of the trunk cable and the branch cables relative to the splice enclosure.

SUMMARY

Certain aspects of the present disclosure relate to fiber optic splice enclosures having features such as cable management trays and splice trays designed to enhance cable management within the splice enclosure. Other aspects of the present disclosure relate to arrangements that allow trunk cables and branch cables to be quickly and easily mechanically secured relative to a splice enclosure.

A variety of additional aspects will be set forth in the description that follows. The aspects can relate to individual features and to combinations of features. It is to be understood that both the foregoing general description and the following detailed description are exemplary and explanatory only and are not restrictive of the broad features upon which the embodiments disclosed herein are based.

BRIEF DESCRIPTION OF THE DRAWINGS

FIG. 9 is a perspective view showing a base of the fiber optic splice enclosure of FIG. 1;

FIG. 10 is a plan view of the base of FIG. 9;

FIGS. 16-19 show various views of a compression insert used to mechanically secure branch cables within the fiber optic splice enclosure of FIG. 1;

FIG. 20 shows a strength member routing layout for the compression insert of FIGS. 16-19;

FIGS. 37-39 show various views of a splice tray cover used to cover each of the splice trays of the splice tray stack of FIG. 30 in accordance with the principles of the present disclosure;

DETAILED DESCRIPTION

Figure 1:
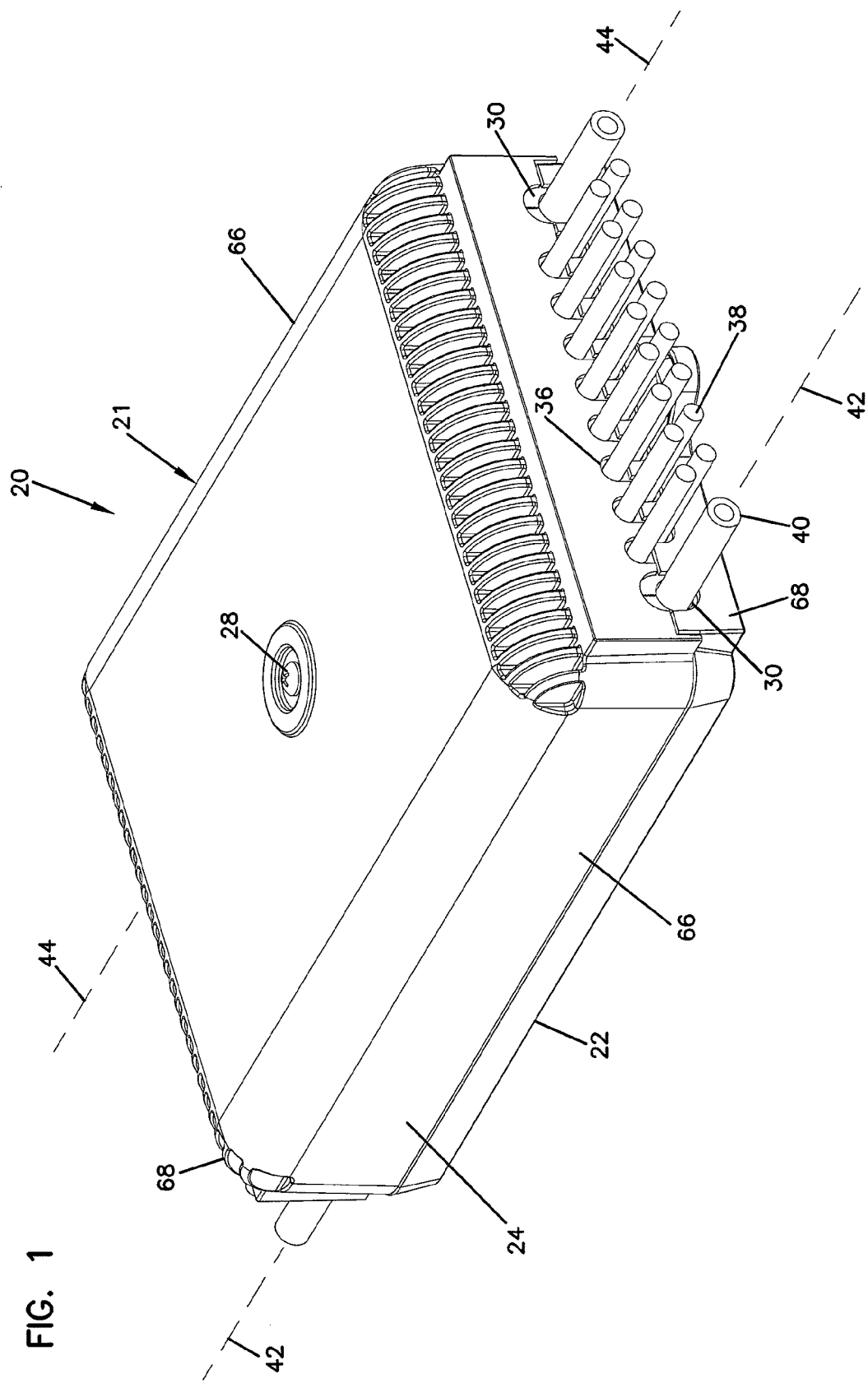
FIG. 1 is a perspective view of a fiber optic splice enclosure in accordance with the principles of the present disclosure.
Figure 2:
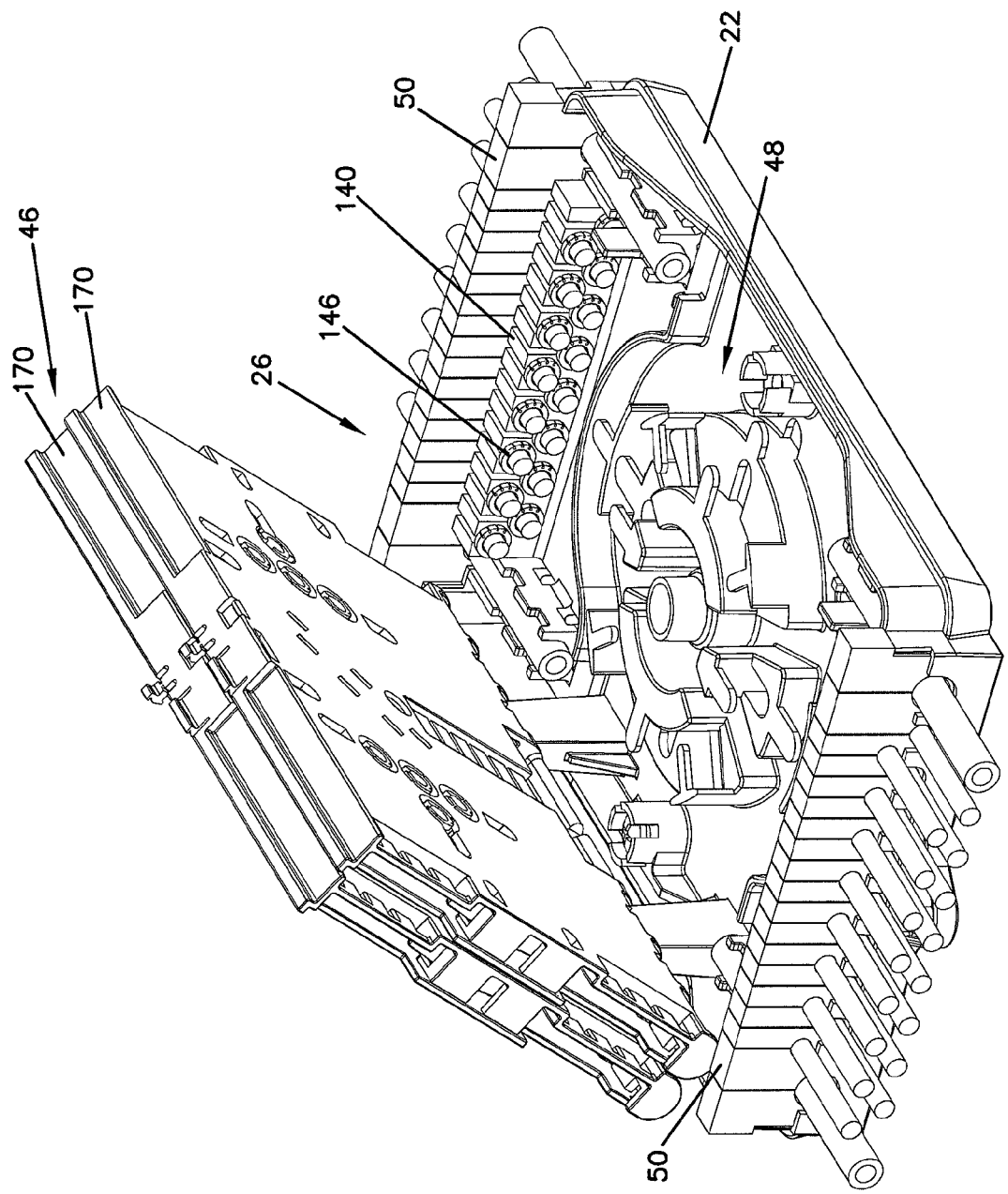
FIG. 2 shows the fiber optic splice enclosure of FIG. 1 with the cover removed and with splice trays pivoted outwardly to reveal an underlying cable management tray.
Figure 3:
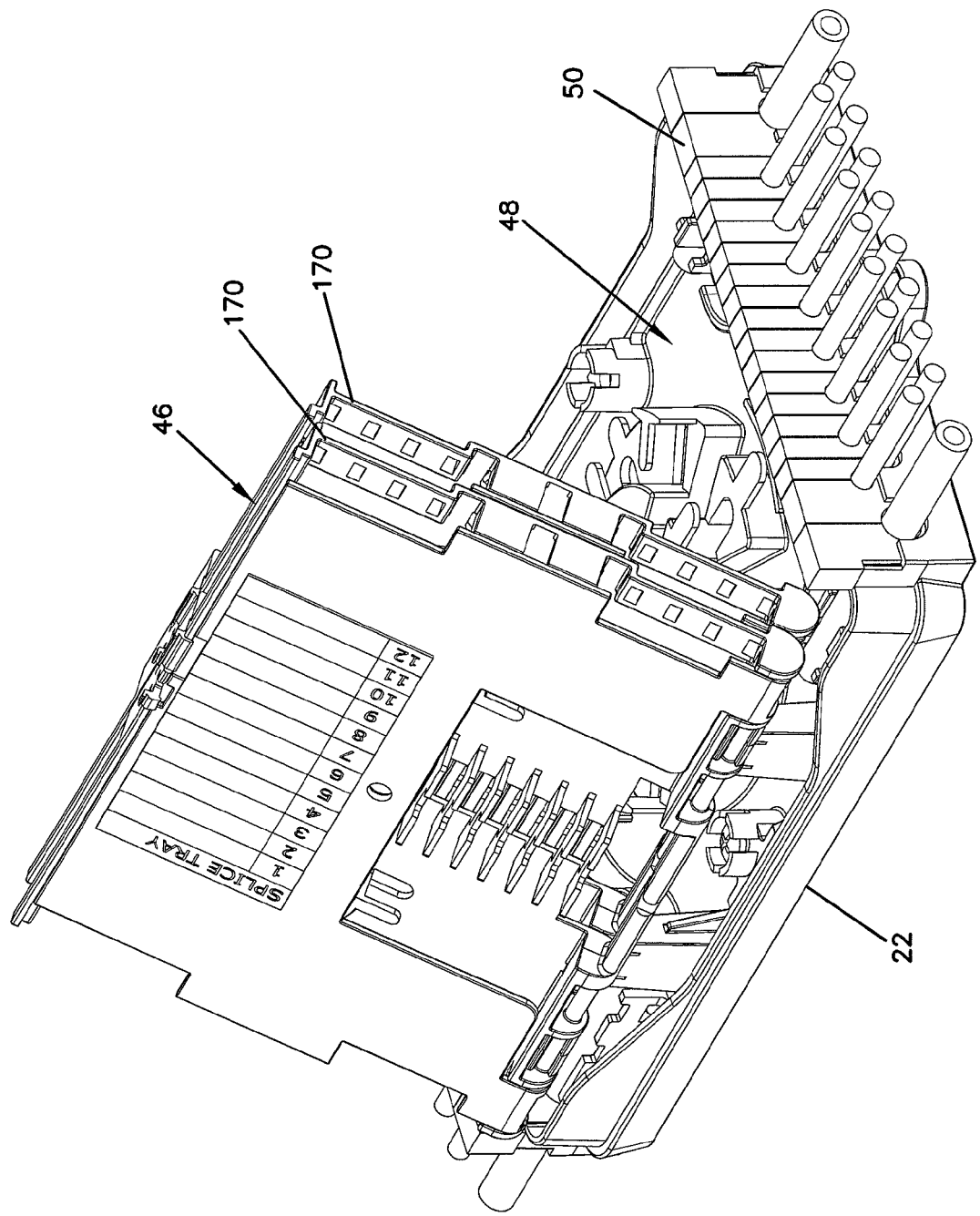
FIG. 3 is another view of the fiber optic splice enclosure of FIG. 1 with the cover removed and the splice trays pivoted open to reveal the underlying cable management tray.
Figure 4:
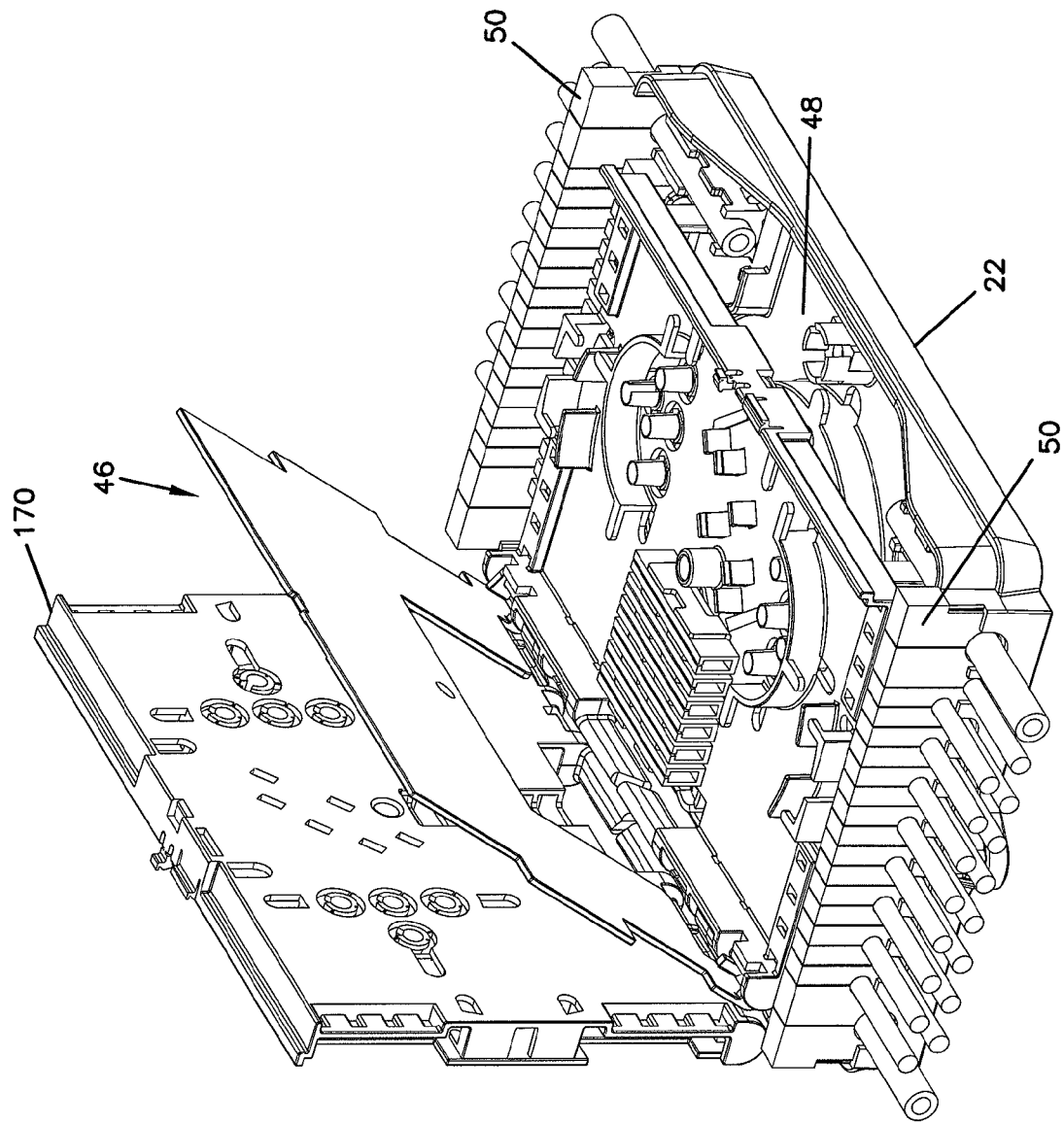
FIG. 4 shows the fiber optic splice enclosure of FIG. 1 with the cover removed and one of the splice trays pivoted open to reveal an underlying splice tray.
Figure 5:
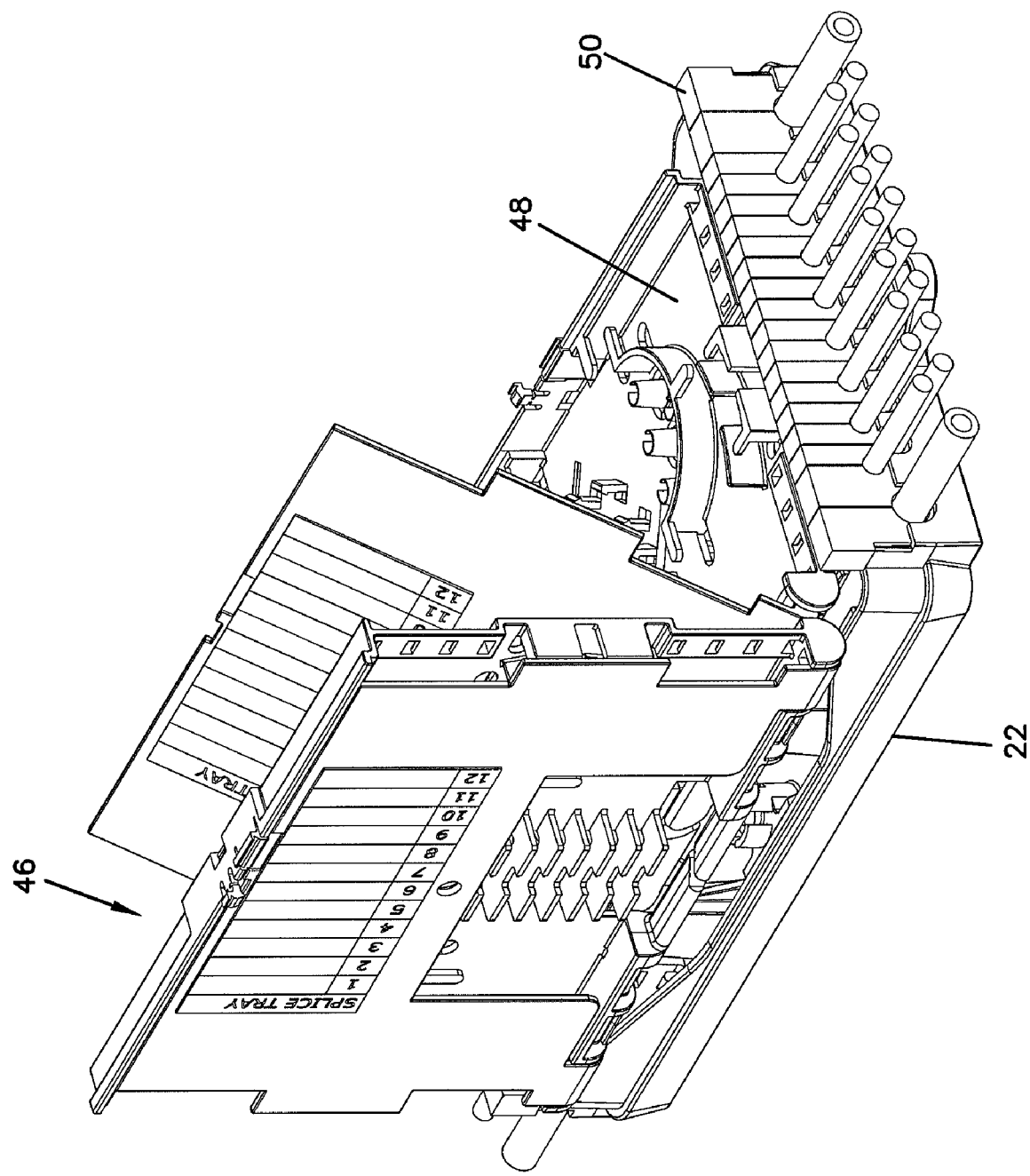
FIG. 5 is another view of the fiber optic splice enclosure of FIG. 1 with the cover removed and with one of the splice trays pivoted open.

FIG. 1 shows a fiber optic splice enclosure 20 having features in accordance with the principles of the present disclosure. The fiber optic splice enclosure 20 includes a housing 21 having a base 22 and a cover 24 that cooperate to define an enclosed interior region 26 (see FIG. 2). The housing 21 includes opposite sides 66 that extend between opposite ends 68. A centrally located fastener 28 (e.g., a bolt, screw or other fastener) is used to secure the cover 24 to the base 22.

Certain embodiments of the housing 21 have a footprint of no greater than about fifty-four (54) square inches. In certain embodiments, the housing 21 has a footprint of no greater than about forty (40) square inches. In some embodiments, the housing 21 has a length of no greater than about nine (9) inches and a width of no greater than about six (6) inches. Indeed, in some embodiments, the housing 21 has a length of no greater than about eight (8) inches and a width of no greater than about five (5) inches. In certain embodiments, the housing 21 has a volume of no greater than about 162 cubic inches. In certain embodiments, the housing 21 has a volume of no greater than about eighty (80) cubic inches. In some embodiments, the housing 21 has a depth of no greater than about three (3) inches. Indeed, in some embodiments, the housing 21 has a depth of no greater than about two (2) inches.

In general, the housing 21 defines two or more trunk cable ports 30. In the example shown, the housing 21 defines four trunk cable ports 30. The trunk cable ports 30 are each located adjacent a corner of the housing 21 with two of the cable ports 30 being located at each end 68 of the housing 21. The trunk cable ports 30 are configured to receive trunk cables 40. In the example shown, the trunk cable ports 30 allow two trunk cables 40 to be routed through the housing 21 in a straight pass-through configuration in which the entering portion of the trunk cable 40 and the exiting portion of the trunk cable 40 are aligned along a common axis. For example, as shown in FIG. 1, one of the trunk cables 40 passes through the housing 21 along a first pass-through axis 42, while the other trunk cable 40 passes through the housing 21 along a second pass-through axis 44. The positioning of the trunk cable ports 30 also allows trunk cables 40 to be routed through the housing 21 in a looped or butt-end configuration. For example, a trunk cable 40 can enter the housing 21 along axis 42 through one of the trunk cable openings 30 and can exit the housing 21 along axis 44 through the other trunk cable opening 30 located at the same end of the housing 21.

The housing 21 also defines a plurality of branch cable ports 36. For example, in FIG. 1, sixteen branch cable ports 36 are shown between the trunk cable openings 30 at each end 68 of the housing 21. The branch cable ports 36 allow branch cables, such as drop cables 38, to be routed out of the splice enclosure 20 and directed to a location, such as a subscriber location.

Referring now to FIGS. 2-5, the fiber optic splice enclosure 20 also includes various components positioned within the interior region 26 of the housing 21. For example, the splice enclosure 20 includes a splice tray stack 46 that pivotally mounts within the housing 21. The splice tray stack 46 can include one or more splice trays. The splice enclosure 20 also includes a fiber management tray 48 that mounts to the base 22 of the housing 21 at a location beneath the splice tray stack 46. The splice enclosure 20 also includes sealing blocks 50 located adjacent the ends 68 of the housing 21 for sealing the branch cable openings 36 and the trunk cable openings 30. The splice enclosure 20 further includes cable retention arrangements located adjacent the sealing blocks 50 for mechanically securing the drop cables 38 to the splice enclosure 20.

Figure 8:
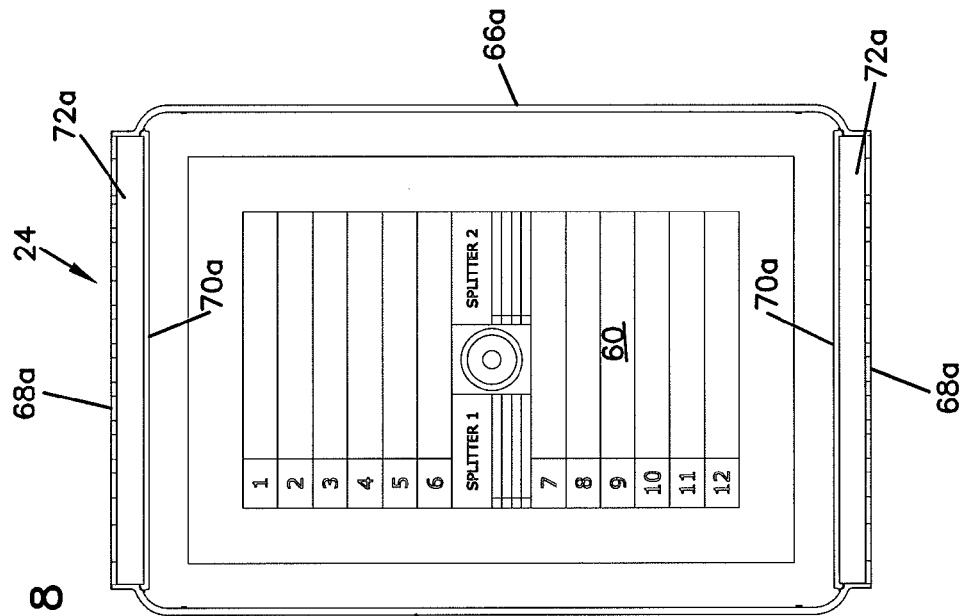
FIG. 8 is a plan view showing the interior of the cover of the fiber optic splice enclosure of FIG. 1.
Figure 6:
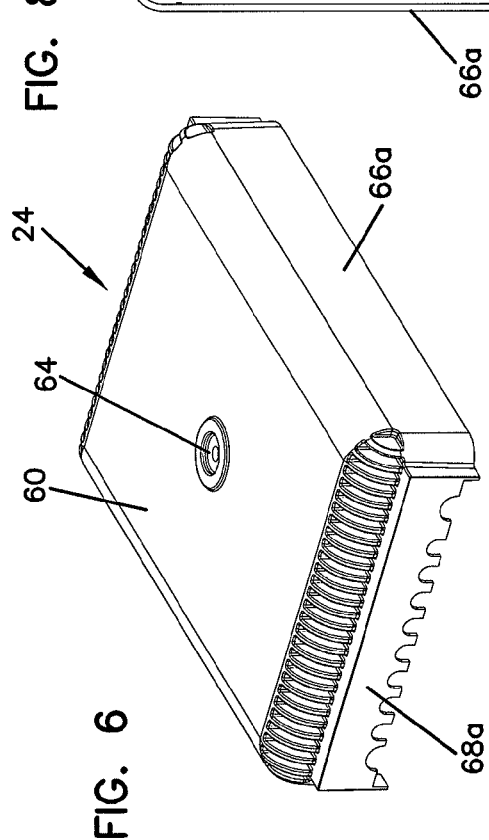
FIG. 6 is a perspective view showing an outside of the cover of the fiber optic splice enclosure of FIG. 1.
Figure 7:
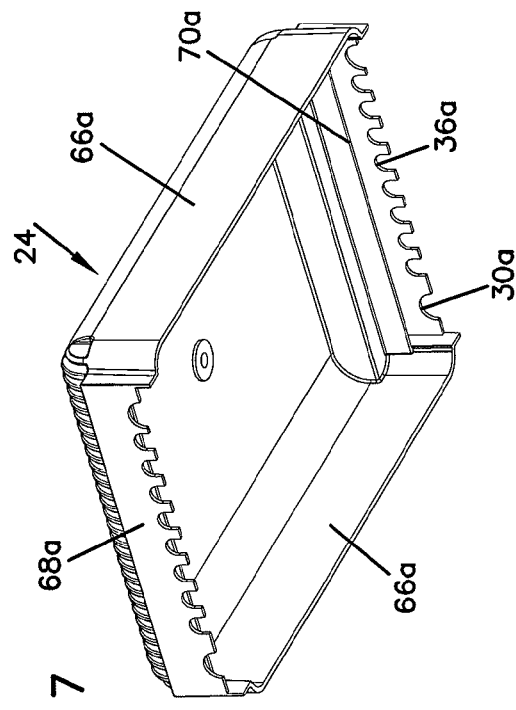
FIG. 7 is a perspective view showing an interior of the cover of the fiber optic splice enclosure of FIG. 1.

Referring to FIGS. 6-8, the cover 24 includes a generally rectangular front wall 60 defining a central fastener opening 62 for receiving the fastener 28. A countersunk region 64 is located at the front face of the front wall 60 surrounding the fastener opening 62 for allowing a head of the fastener 28 to be recessed into the front wall 60. The cover 24 also includes oppositely positioned side walls 66a that extend between oppositely positioned end walls 68a. The side walls 66a and end walls 68a extend rearwardly from the front wall 60. As shown in FIGS. 7 and 8, the cover 24 also includes interior walls 70a spaced inwardly from the end walls 68. Rectangular pockets 72a are defined between the interior walls 70a and the end walls 68a. Curved notches 30a, 36a are defined at lower ends of the walls 68a, 70a.

Referring to FIGS. 9 and 10, the base 22 includes a generally rectangular rear wall 74. A captured nut arrangement 76 is provided at the center of the rear wall 74 for receiving the fastener 28 when the cover 24 is fastened to the base 22. Latches 78 are integrally formed with the rear wall 74. The latches 78 function to connect the fiber management tray 48 to the rear wall 74 by a snap-fit connection. The base 22 also includes oppositely positioned side walls 66b and oppositely positioned end walls 68b that extend between the side walls 66b. Interior walls 70b are provided adjacent the ends walls 68b. The interior walls 70b and the end walls 68b cooperate to define pockets 72b. The lower ends of the end walls 68b and the interior walls 70b define curved notches 30b, 36b. The side walls 66b include inset portions 75 connected to outset portions 77 by shoulders 79. The base 22 further includes mounting tabs 80 that project outwardly from the end walls 68b. The mounting tabs 80 define fastener openings adapted to receive fasteners for securing the base to a structure such as a wall, floor, pole or other structure to which it is desired to mount the splice enclosure 20.

When the cover 24 is mounted on the base 22, the side walls 66a of the cover 24 slide over the inset portions 75 of the side walls 66b until the ends of the side walls 66a seat on the shoulders 79. As so positioned, the side walls 66a, 66b cooperate to define the sides 66 of the housing 21, and the end walls 68a, 68b cooperate to define the ends 68 of the housing 21. Additionally, the curved notches 30a, 30b cooperate to define the trunk cable ports 30 and the curved notches 36a, 36b cooperate to define the branch cable ports 36. Further, the sealing blocks 50 are captured within the pockets 72a, 72b so as to be held in alignment with the openings 30, 36. The sealing blocks 50 are made of a resilient material (e.g., foam or rubber) and have cable receiving openings that align with the ports 30, 36. The blocks 50 also define slots for inserting cables into the cable receiving ports.

Figure 11:
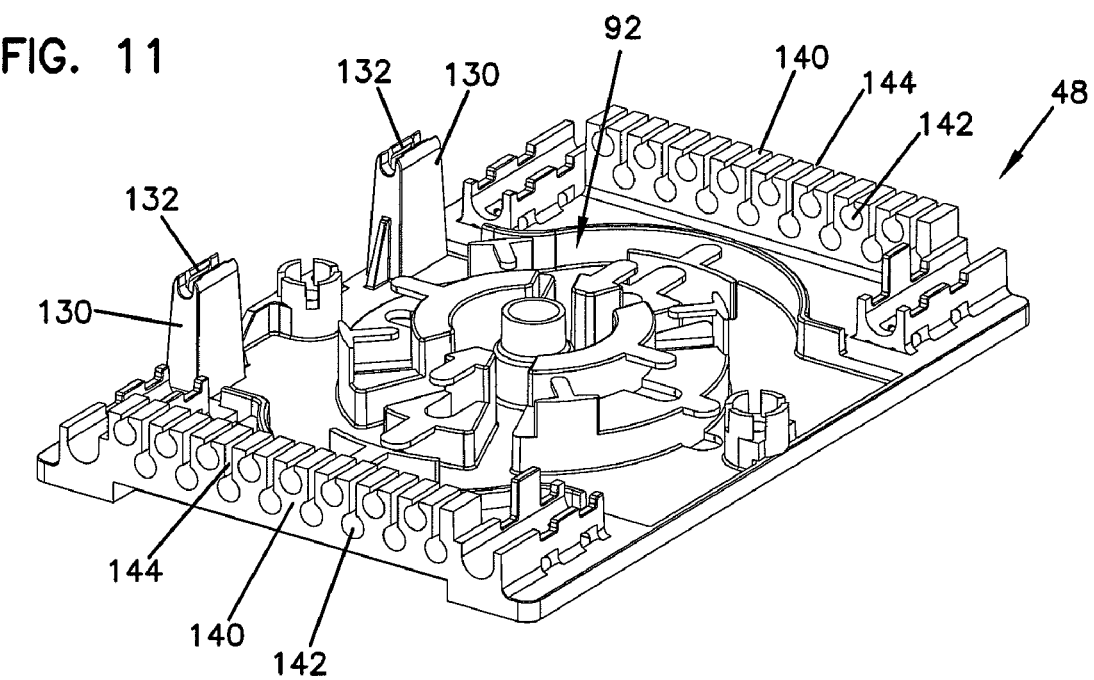
FIG. 11 is a perspective view showing a top side of a cable management tray that mounts within the interior of the fiber optic splice enclosure of FIG. 1.
Figure 12:
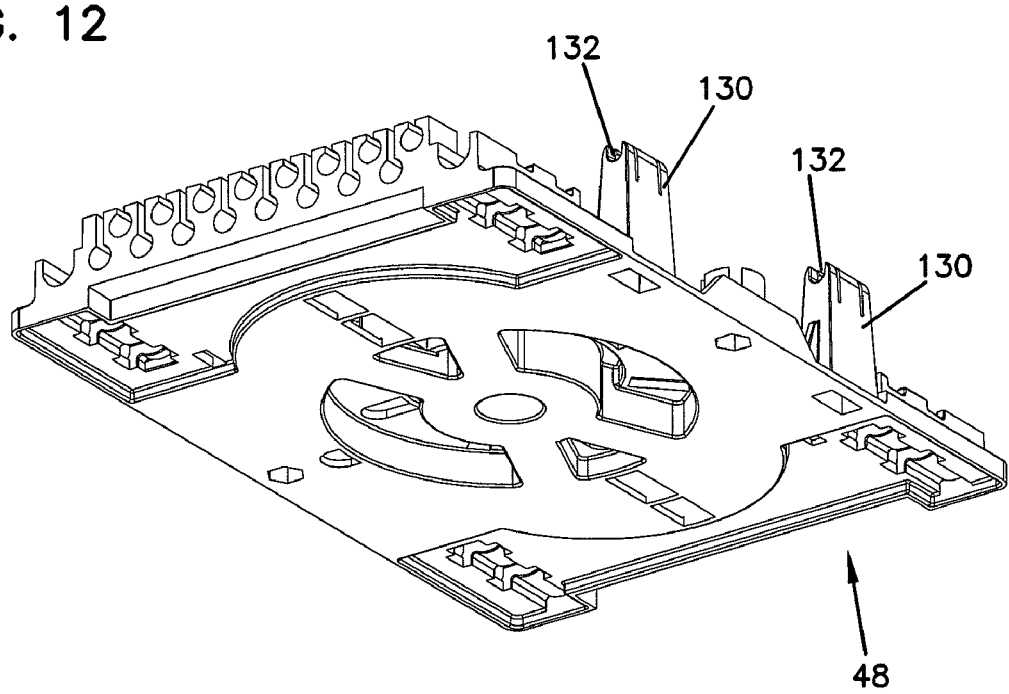
FIG. 12 is a perspective view of the bottom of the fiber management tray of FIG. 11.
Figure 13:
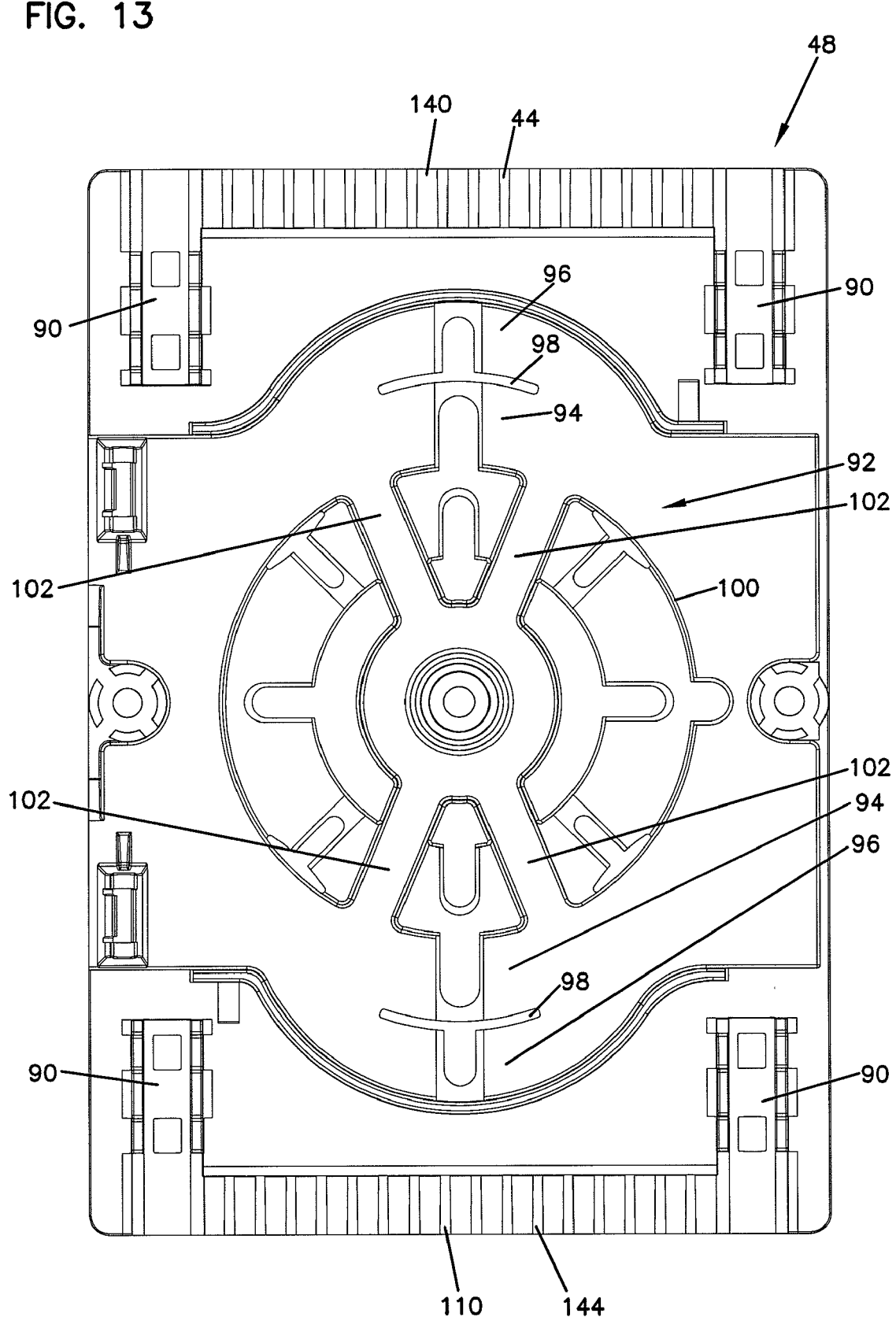
FIG. 13 is a top, plan view of the fiber management tray of FIG. 11.

Referring to FIGS. 11-13, the fiber management tray 48 of the splice enclosure 20 is generally used to manage optical fibers of cables that are to be spliced together. The fiber management tray 48 includes numerous structures for managing optical fibers and for securing optical cables to the splice enclosure 20. For example, the fiber management tray 48 can include cable cradles 90 that align with the trunk cable ports 30 and that are sized for receiving jacketed portions of the trunk cables 40. In the example shown, the fiber management tray 48 includes four cable cradles 90.

The fiber management tray 48 also defines retention locations at which strength members of the cables (e.g., trunk cables 40 and branch cables 38) can be secured. The fiber management tray 48 also can define retention locations at which jacketed portions of the cables can be secured. In certain embodiments, the retention locations for the jacketed portions of the cables can be separate from the retention locations for the strength members of the cables. In certain embodiments, the fiber management tray 48 can include a fastener about which the strength members of the cables can be wrapped at each retention location. The fiber management tray 48 also can include at each retention location a hub into which the fastener can be secured to secure the strength members to the fiber management tray 48.

Figure 14:
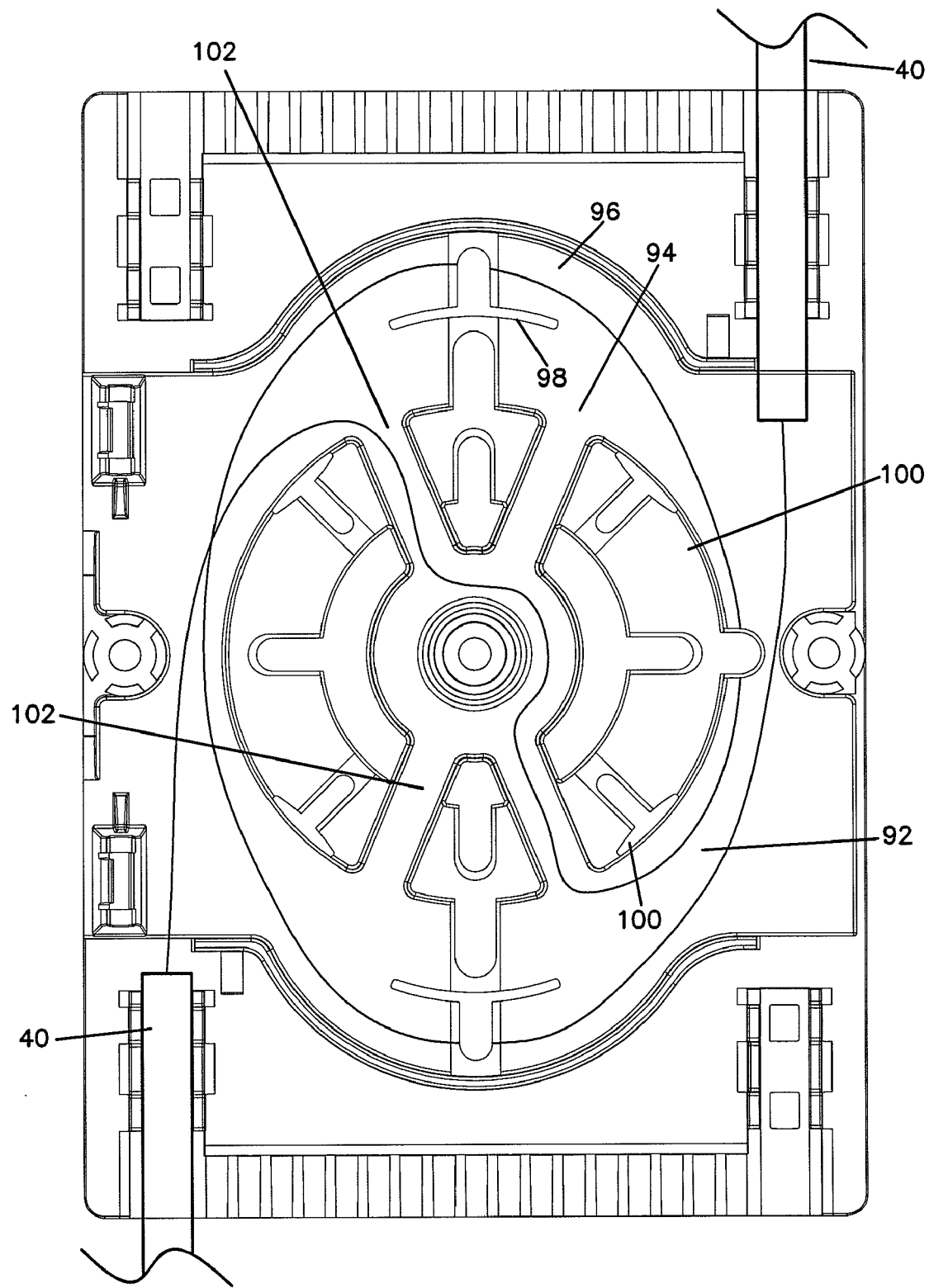
FIG. 14 shows another cable management layout for the fiber management tray of FIG. 11.

The fiber management tray 48 also can include a central spooling section 92 (see FIG. 13). The spooling section 92 includes an inner spooling path 94 and an outer spooling path 96. Dividers 98 separate the inner spooling path 94 from the outer spooling path 96. The inner spooling path 94 extends around a central spool structure 100. The outer spooling path 96 extends around the dividers 98 and also includes portions that extend around the central spool structure 100. The dividers 98 and the central spool structures 100 have curvatures that assist in maintaining minimum bend radius requirements for fiber stored at the spooling section 92. The central spool structure 100 also includes cross-paths 102 that extend crosswise through the central spooling structure. As shown at FIG. 14, the cross-paths 102 can be used to facilitate changing a spooling direction of a fiber being routed around the central spool structure 100.

As shown at FIGS. 11 and 12, the fiber management tray 48 also includes a pair of standoffs 130 that project forwardly from a main body of the tray 48. The standoffs 130 have snap-fit receptacles 132 at their free ends for pivotally receiving corresponding pivot pins of the splice tray stack 46. The standoffs 130 assist in offsetting the splice tray stack 46 from the spooling section 92 of the fiber management tray 48.

Figure 15:
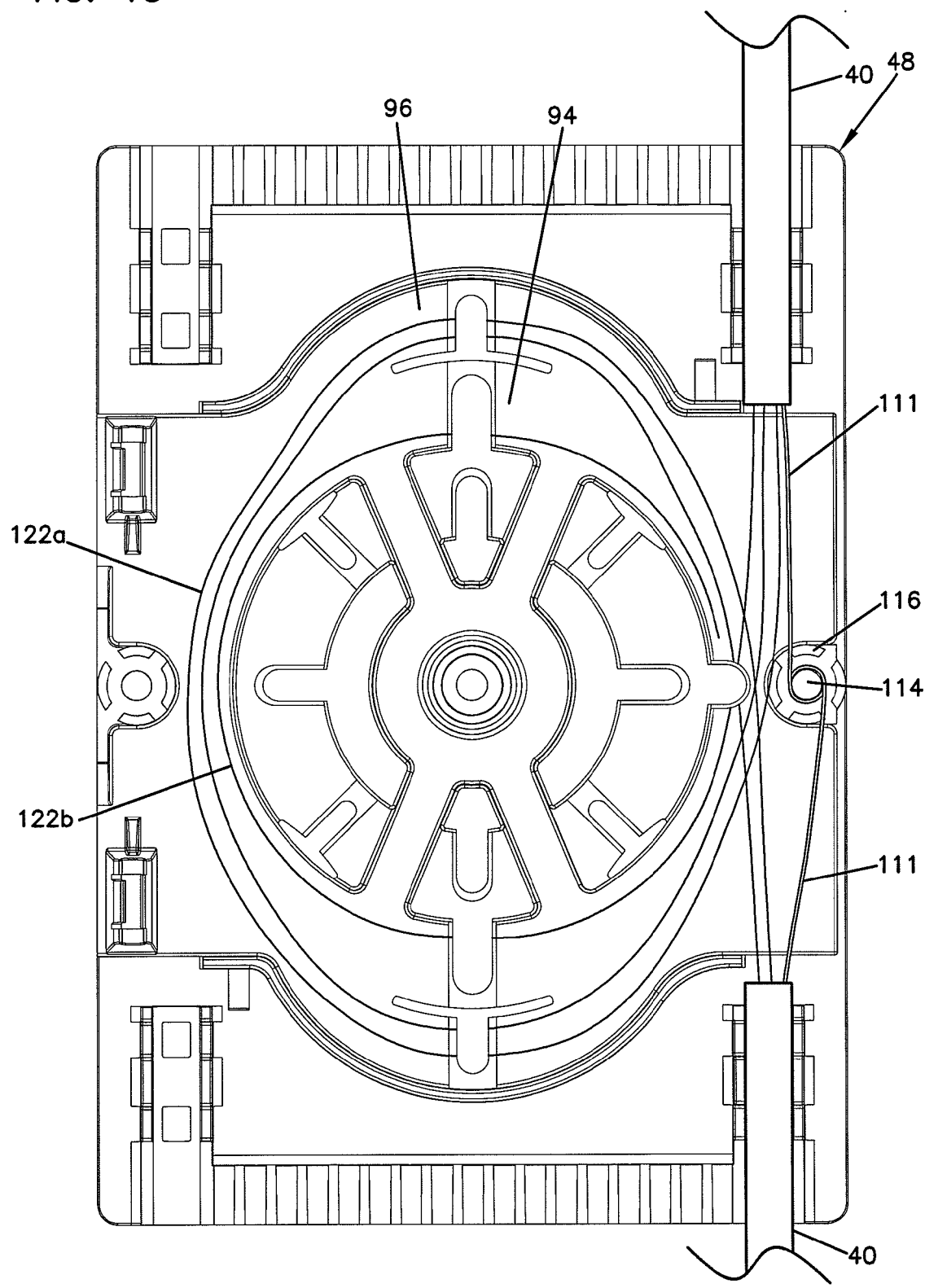
FIG. 15 shows a cable management layout for the fiber management tray of FIG. 11.

Typically, the fiber management tray 48 is used to manage fibers corresponding to a mid-span access location of one or more trunk cables 40. To provide a mid-span access location, a section of jacket (e.g., a 1.5 meter section) is removed from a mid-span location of the trunk cable 40. As the term is used herein, a mid-span location refers to a section of cable that does not include either of the opposite ends of the cable. As shown at FIG. 15, jacketed portions 110 of the trunk cables 40 are placed within the cradles 90 of the fiber management tray 48. Strength members 111 (e.g., aramid yarn) of each trunk cable 40 can be cut, grouped, and secured at one or more trunk cable retention locations 112 provided on the fiber management tray 48.

With the jacket and strength members 111 removed from the trunk cable 40 at the mid-span access location, the trunk cable 40 typically has one or more exposed buffer tubes at the mid-span access location. Each buffer tube includes one or more optical fibers. In certain embodiments, the fibers include bend insensitive optical fibers or standard optical fibers. Typically, only some of the fibers will be accessed at the splice enclosure 20. Buffer tubes 122a corresponding to fibers not intended to be accessed can be routed from an incoming portion of the trunk cable 40, around the outer spooling path 96 of the central spooling section 92, to an outgoing section of trunk cable 40. Buffer tubes 122b containing fibers to be accessed can be terminated adjacent the incoming end of the cable 40. The length of terminated buffer tube (e.g., about 1.5 meters) can be wrapped around the inner spooling path 94 until needed. When needed, terminated fibers can be routed from the fiber management tray 48 up to one of the splice trays of the splice tray stack 46.

The fiber management tray 48 also includes two cable retention blocks 140 that are integrally formed with a main body of the fiber management tray 48. When the fiber management tray 48 is secured to the base 22 of the enclosure 20, the cable retention blocks 140 are located adjacent the ends 68 of the housing 21. Each of the cable retention blocks 140 defines a plurality of retention openings 142 that align with the branch cable ports 36 defined by the housing 21. In some embodiments, each of the cable retention blocks 140 defines two rows of retention openings 142. In one embodiment, the retention openings of one row are offset from the retention openings 142 of the other row (e.g., see FIG. 1). The cable retention blocks 140 also define access slots 144 that extend from top sides of the cable retention blocks 140 to each of the retention openings 142. The access slots 144 allow cables, such as drop cables 38, to be inserted downwardly through the access slots 144 and into the retention openings 142.

In certain embodiments, each of the retention openings 142 has a tapered (e.g., truncated conical) configuration such that the retention openings 142 have minor diameters at the sides of the cable retention blocks 140 that face the ends 68 of the housing 21 and major diameters at the sides of the cable retention blocks 140 that face toward the central spooling section 92 of the fiber management tray 48. While the openings 142 have been described as having truncated conical shapes, other shapes having tapered cross-dimensions could also be used.

In certain embodiments, the cable retention blocks 140 work in combination with compression inserts 146 (see FIGS. 2 and 16-19) to mechanically secure the drop cables 38 to the splice enclosure 20. The compression inserts 146 define central passages 148 that extend through the compression inserts 146 and that are sized to receive jacketed drop cables 38. The compression inserts 146 also define side slots 150 for allowing the drop cables 38 to be inserted laterally into the central passages 148. In certain embodiments, the compression inserts 146 can be manufactured of a resilient material such as rubber or plastic.

The compression inserts 146 further include plug portions 152 having first ends 154 positioned opposite from second ends 156. The plug portion 152 has a tapered outer diameter and a constant inner diameter. The outer diameter is tapered such that the diameter gradually increases in size in a direction extending from the first end 154 to the second end 156 (see FIG. 19). In this manner, the plug portion 152 has a minor outer diameter $D_m$ at the first end 154 and a major outer diameter $D_M$ at the second end 156. The taper of the diameter of the plug portion 152 is preferably selected to generally match the tapered configuration of the retention openings 142. Thus, by inserting the first ends 154 into the major diameters of the retention openings 142 and pressing the plug portions 152 into the retention openings 142, the matching tapers causes the plug portion 152 to be compressed radially inwardly, thereby reducing the diameter of the central passage 148 and causing a drop cable 38 positioned within the central passage 148 to be clamped within the compression insert 146.

The compression inserts 146 also can include flanges 158 located at the second ends 156 of the plug portions 152. The flanges 158 project radially outwardly from the plug portions 152 and abut with the inner sides of the cable retention blocks 140 when the compression inserts 146 are fully inserted within the retention openings 142. The flanges 158 define a plurality of strength member passages 160 that extend through the flanges 158 in directions generally parallel to the central passages 148 (e.g., see FIGS. 17 and 18). The flanges 158 also define access slots 162 that allow strength members (e.g., aramid yarn) corresponding to the drop cables 38 to be inserted into the strength member passages 160. As shown at FIG. 20, strength members 39 from the drop cable 38 can be grouped together, routed back through at least one of the strength member passages 160, and wrapped around the exterior of the plug portion 152 prior to inserting the compression insert 146 within its corresponding retention opening 142. In this manner, further retention of the drop cable 38 is provided.

Figure 21:
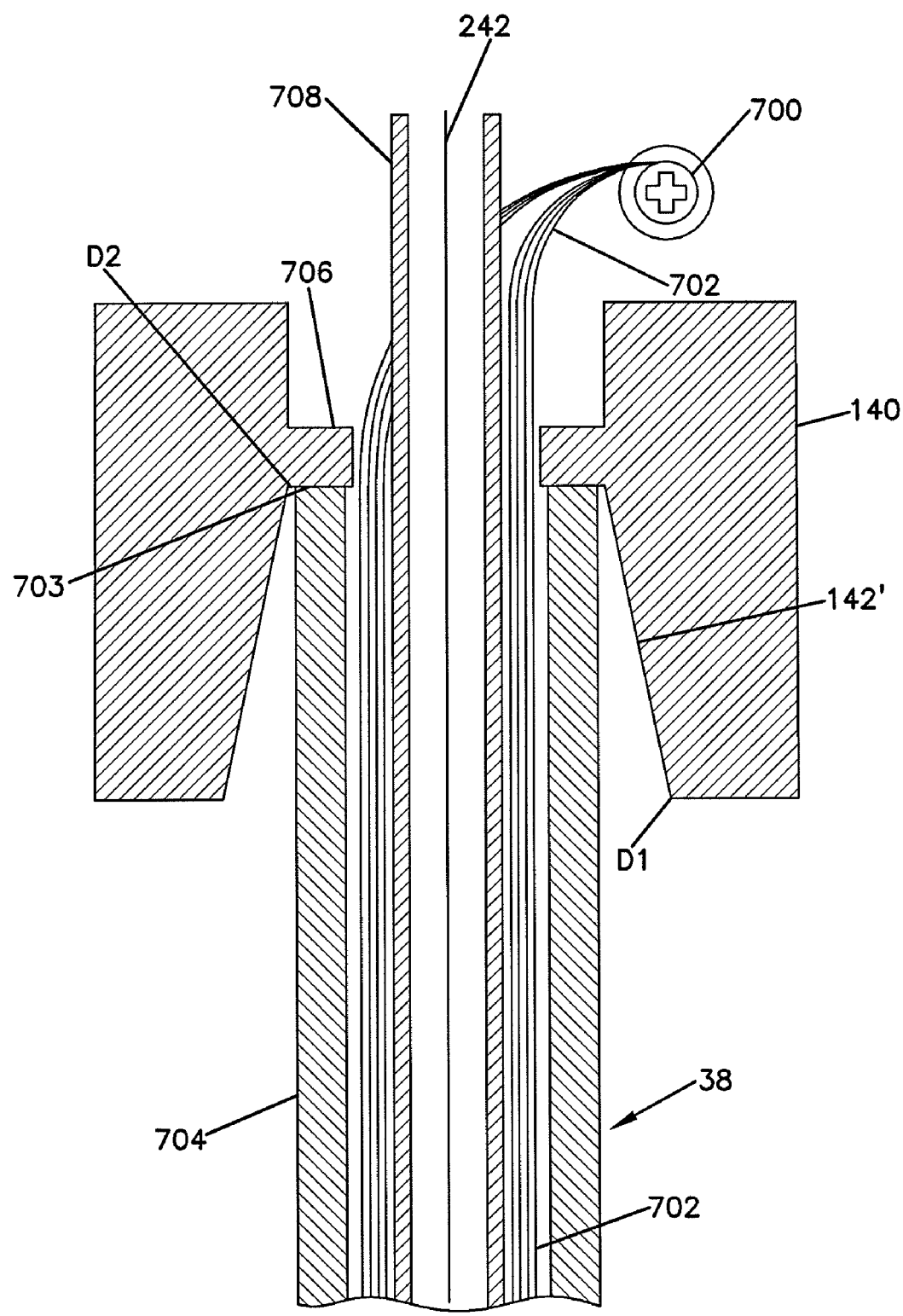
FIG. 21 shows an alternative drop cable securing arrangement that can be used in accordance with the principles of the present disclosure.
Figure 22:
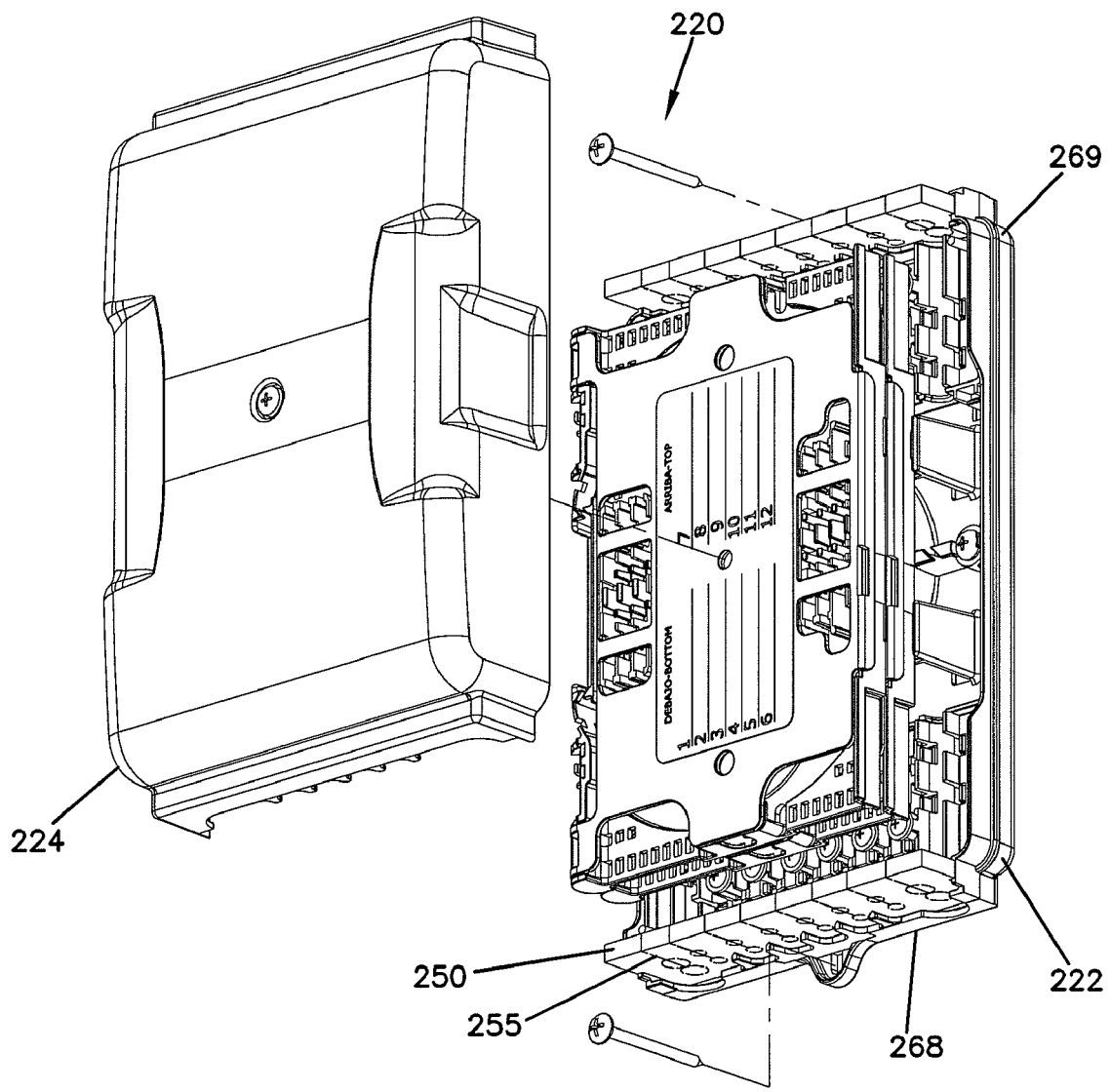
FIG. 22 is a front perspective view of another example embodiment of a splice enclosure in accordance with the principles of the present disclosure.

In certain embodiments, anchoring fasteners can be provided on the management tray 48 at a location adjacent to the cable retention blocks 140. For example, FIG. 21 shows an example anchoring fastener 700 positioned adjacent to one of the cable retention blocks 140. At FIG. 21, strength members 702 (e.g., a length of aramid yarn) of one of the drop cables 38 are shown wrapped around and anchored to the fastener 700, which is secured to the base of the fiber management tray 48. Anchoring the strength members 702 to the fiber management tray 48 by the fastener 700 inhibits the cable 38 from being pulled axially out from the splice enclosure 20.

Additionally, certain example embodiments of retention blocks 140' define openings 142' that are configured to prevent the drop cables 38 from being pushed manually into the splice enclosure 20. For example, the openings 142' can be configured to interfere or otherwise engage with ends 703 of jackets 704 of the drop cables 38. As shown in FIG. 21, the depicted opening 142' has a tapered configuration with a maximum diameter D1 and a minor diameter D2. The tapered configuration of the opening 142' provides a transition from the outer portion of the opening 142' to a retaining shoulder 706 provided within the opening 142'. The end 703 of the jacket 704 abuts against the retaining shoulder 706 to prevent the drop cable 38 from being pushed completely through the opening 142'. A buffer tube 708 and fiber 242 of the drop cable 38 pass through the opening 142' and are preferably managed at the spooling section of the cable management tray 48.

It will be appreciated that other retention arrangements can be used to secure the drop cables 38 to the fiber management tray. For example, FIGS. 22-29 illustrate another example embodiment of a splice enclosure 220 configured to hold one example cable management tray 248 and at least one example splice tray stack 46. The splice enclosure 220 includes a base 222 and a cover 224 defining an interior in which the cable management tray 248 and splice tray 246 can be mounted. Opposite ends 268, 269 of the enclosure 220 each define an opening 225 through which the trunk cables 40 and drop cables 38 can enter and exit the enclosure 220 (see FIG. 23).

Certain embodiments of the enclosure 220 have a footprint of no greater than about fifty-four (54) square inches. In certain embodiments, the enclosure 220 has a footprint of no greater than about forty (40) square inches. In some embodiments, the enclosure 220 has a length of no greater than about nine (9) inches and a width of no greater than about six (6) inches. Indeed, in some embodiments, the enclosure 220 has a length of no greater than about eight (8) inches and a width of no greater than about five (5) inches. In certain embodiments, the enclosure 220 has a volume of no greater than about 162 cubic inches. In certain embodiments, the enclosure 220 has a volume of no greater than about eighty (80) cubic inches. In some embodiments, the enclosure 220 has a depth of no greater than about three (3) inches. Indeed, in some embodiments, the enclosure 220 has a depth of no greater than about two (2) inches.

Figure 23:
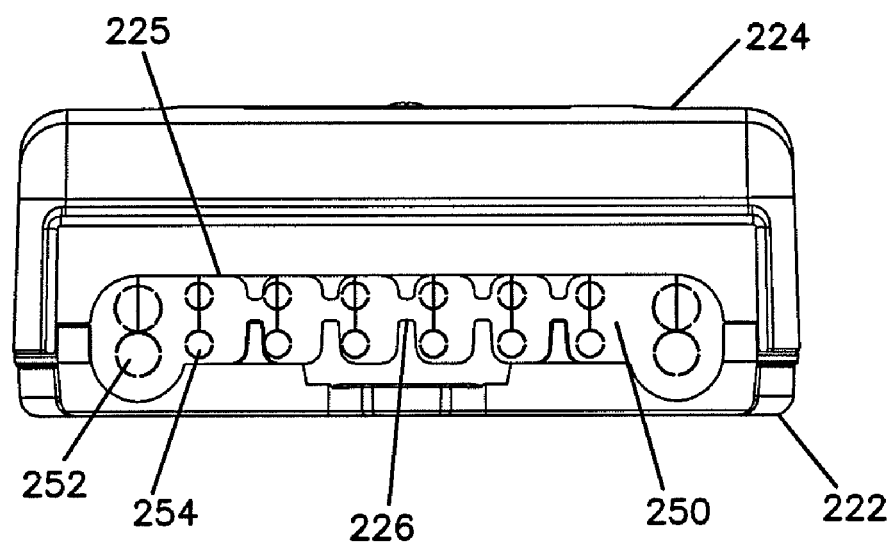
FIG. 23 is an end view of the splice enclosure of FIG. 22 in accordance with the principles of the present disclosure.

The splice enclosure 220 also includes sealing blocks 250 (FIGS. 22 and 29) located adjacent the ends 268, 269 of the housing for sealing the openings 225. In certain embodiments, fingers 226 protrude inwardly from edges of the opening 225 to aid in holding the sealing blocks 250 in position. Each sealing block 250 also helps in defining the trunk and branch cable ports within the openings 225. For example, as shown in FIG. 23, the sealing block 250 can define at least one trunk cable port 252, at least one branch cable port 254, and a slot 255 extending from each one of the ports to a top of the sealing block 250. In certain embodiments, each slot 255 extends through two ports, such as two trunk cable ports 252 or two branch cable ports 254 (see FIG. 22).

In general, each end 268, 269 of the splice enclosure 220 cooperates with the respective sealing block 250 to define at least one trunk cable port and at least one branch cable port. In certain embodiments, at least one row of branch cable ports extends between at least two spaced-apart trunk cable ports on at least one end 268, 269 of the enclosure 220. In some embodiments, two or more rows of branch cable ports extend between the trunk cable ports. In certain embodiments, the splice enclosure 220 and sealing block 250 define at least nine branch cable ports at each end 268, 269. In the example shown in FIGS. 22 and 23, two rows of six branch ports extend between two columns of trunk cable ports on each end 268, 269. Each column of trunk cable ports includes two trunk cable ports stacked one on top of the other. In other embodiments, however, the splice enclosure 220 and the sealing block 250 can define other port arrangements.

Cables can be routed into and out of the splice enclosure 220 through the cable ports. In some embodiments, cables are installed on the splice enclosure 220 by sliding the trunk and/or branch cables along the slots 255 of the sealing blocks 250 to secure the cables into the respective cable ports. In other embodiments, the trunk and/or branch cables can be fed through the respective cable ports from one side of the sealing block 250.

The fiber management tray 248 of the splice enclosure 220 is generally used to manage optical fibers of cables that are to be spliced together. The fiber management tray 248 includes numerous structures for managing optical fibers. The management tray 248 further includes cable retention arrangements located adjacent the sealing blocks 250 for mechanically securing the cables 38, 40 to the splice enclosure 220. For example, the management tray 248 can include first retention arrangements at which jacketed portions of the cables can be mounted to the management tray 248 and second retention arrangements at which strength members of the cables can be mounted to the tray 248.

In general, the first retention stations are arranged adjacent the cable ports to receive the cables. Jacketed portions of the trunk cables 40 can be secured at first trunk retention stations 290 and jacketed portions of the branch cables 38 can be retained at first branch retention stations 294. In the example shown, the first trunk retention stations 290 are arranged at the outer corners of the cable tray 248 and the first branch retention stations are arranged along the ends 268, 269 of the enclosure 220. The first branch retention stations 294 are arranged in one or more rows extending between the first trunk retention stations 290 along the opposite ends 268, 269 of the splice enclosure 220.

In some embodiments, the first branch retention stations 294 are arranged in a lower row 297 and an upper row 298. In the example shown, a lower row 297 of first branch retention stations 294 extends along each end 268, 269 of the splice enclosure 220 and an upper row 298 of first branch retention stations 294 is spaced inwardly from the respective end 268, 269 relative to the lower row 297. In one embodiment, the first branch retention stations 294 of the lower row 297 align with the first branch retention stations 294 of the upper row 298 (see FIG. 25). In another embodiment, the first branch retention stations 294 of the lower row 297 can be positioned offset from the first branch retention stations 294 of the upper row 298.

Each first retention station 290, 294 includes a cable cradle 292, 295 and a mounting structure 293, 296, respectively, at which the jacketed portion of the respective cable can be secured to the tray 248. In certain embodiments, each mounting structure 293, 296 is configured to receive a cable tie 291 with which to secure the respective cable to the tray 248 (see FIG. 27). In one embodiment, the cable ties 291 inhibit the cable jacket from being pushed into the splice enclosure 220. In the example shown in FIGS. 24 and 25, each of the first trunk retention stations 290 includes two spaced-apart mounting structures 293, each configured to receive a cable tie 291. In certain embodiments, each of the first trunk retention stations 290 can secure two or more trunk cables to the splice enclosure 220. For example, in one embodiment, each first trunk retention station 290 can facilitate wrapping a cable tie 291 around the cable jacket portions of two trunk cables 40.

The fiber management tray 248 also defines second retention stations at which strength members of the cables 38, 40 can be secured separately from the cable jackets. In certain embodiments, securing strength members to a second retention station includes cutting the strength members, grouping the strength members together, and fastening the strength members to the tray 248. In certain embodiments, each of the second retention stations at which strength members can be secured includes a fastener about which the strength members can be wrapped and a hub into which the fastener can be secured.

For example, the fiber management tray 248 can define second trunk retention stations 312 at which strength members 411 of the trunk cables 40 can be secured and second branch retention stations 315 at which strength members 412 (FIG. 28) of the branch cables 38 can be secured. Each of the second trunk retention stations 312 can include a fastener 313 mounted to a hub 314 and each of the second branch retention stations 315 can include a fastener 316 mounted to a hub 317. In the example shown in FIGS. 24-25, the fasteners 313, 316 include screw-type fasteners.

Each second trunk retention station 312 corresponds with one or more of the first trunk retention stations 290. In the example shown, each second trunk retention station 312 is arranged generally at a mid-point between two opposing first trunk retention stations 290. Each second trunk retention station 312 is configured to secure the strength members 411 of the trunk cables 40 secured to the opposing first trunk retention stations 290. Each second branch retention station 315 corresponds with at least one of the first branch retention stations 294.

For example, the second branch retention locations 315 can be arranged into a row along either end 268, 269 of the splice enclosure. In the example shown in FIGS. 26-28, each row of second branch retention stations 315 is arranged between the respective rows 297, 298 of first branch retention stations 294. In some embodiments, each second branch retention station 315 is configured to service at least one first branch retention station 294 from each row 297, 298 of first branch retention stations 294. In the example shown, each second branch retention station 315 services two aligned first branch retention stations 294.

Figure 28:
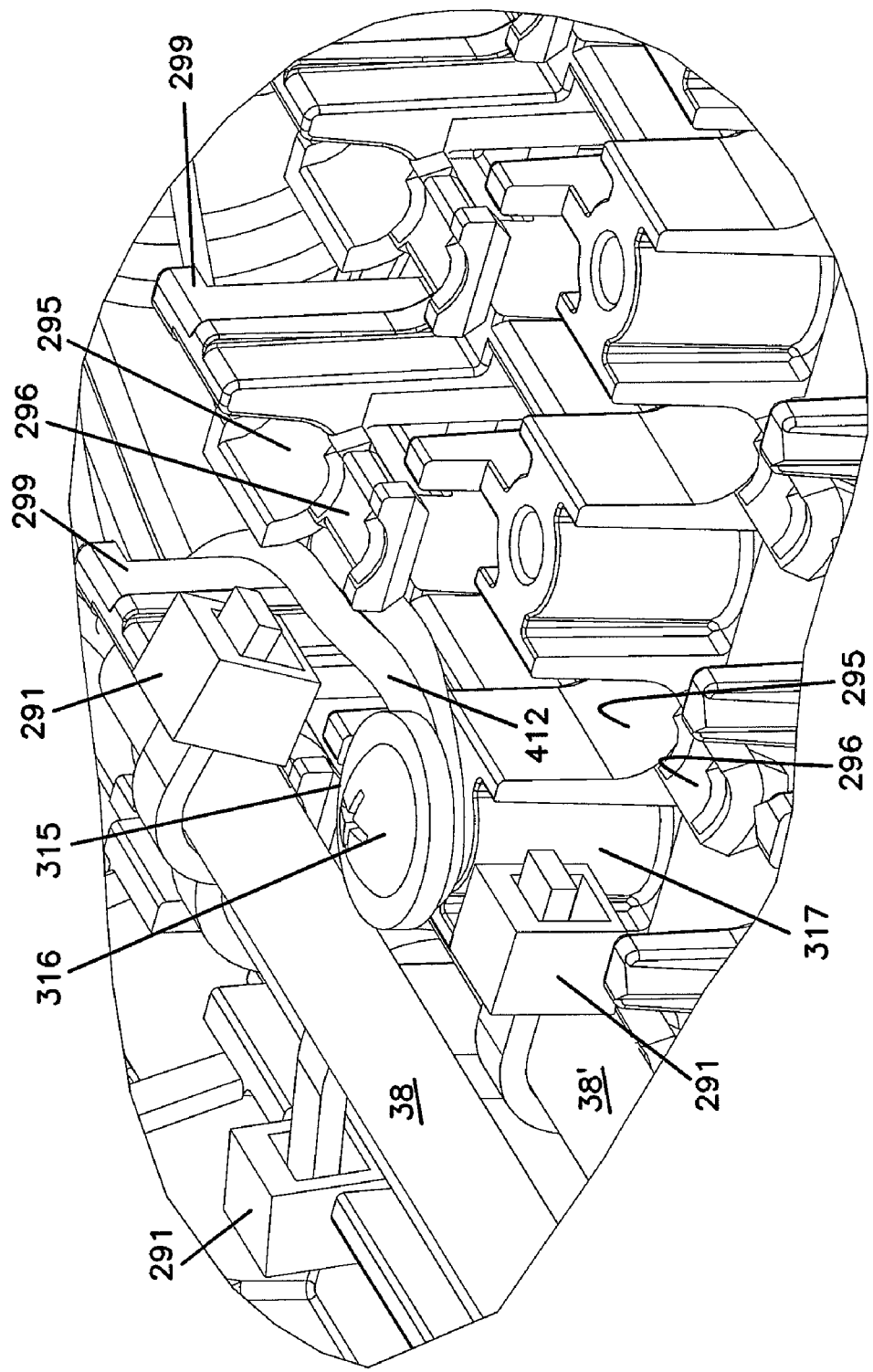
FIG. 28 is a detailed view of section 28 of FIG. 26 in accordance with the principles of the present disclosure.
Figure 29:
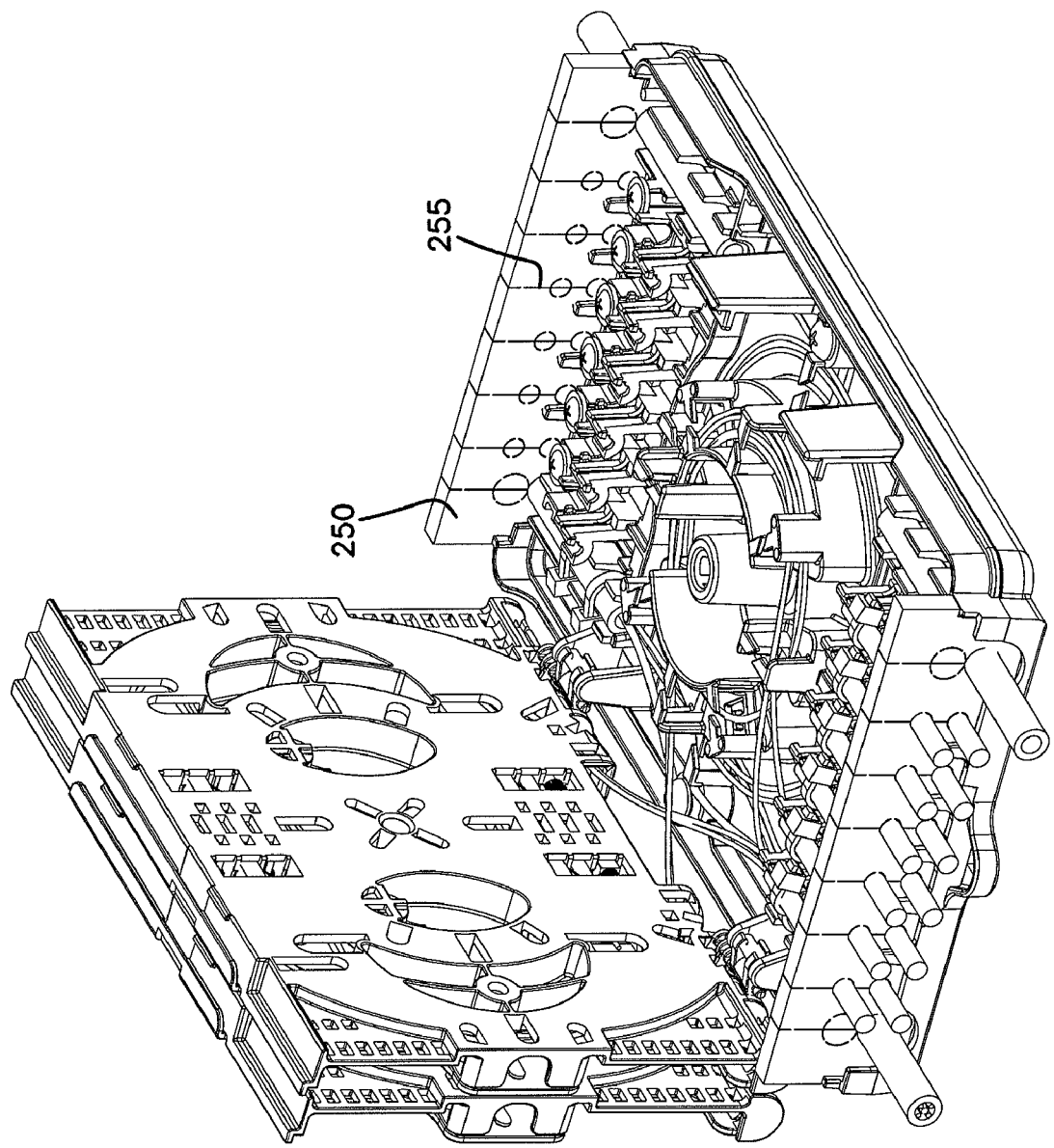
FIG. 29 is a top perspective view of the cable management tray of FIG. 26 after sealing blocks, additional cables, and one additional splice tray have been installed in accordance with the principles of the present disclosure.

In certain embodiments, each first branch retention station 294 of the inner row of the first branch retention stations 294 includes a reversal flange (i.e., a post) 299 around which strength members 412 of a branch cable 38 can be routed to reverse direction to reach the respective second branch retention station 315. For example, as shown in FIG. 28, the first branch retention stations 294 of the upper row 298 include reversal flanges 299 about which strength members 412 of the respective branch cables wrap to reach the row of second branch retention locations 315. Accordingly, the reversal flanges 299 enable the second branch retention stations 315 to be positioned behind at least some of the first branch retention locations 294.

Positioning the second branch retention locations 315 behind at least some of the first branch retention locations 294 inhibits interaction between the unprotected optical fibers and any tool (e.g., a screw driver) used to fasten the strength members to the second retention locations 312, 315. Inhibiting interaction between the screw driver or other sharp implement and the unprotected optical fibers mitigates damage to the optical fibers caused by careless handling or accidental slips of the tool.

For example, in FIG. 28, the second branch retention stations 315 are positioned behind the upper row 298 of first branch retention stations 294 and in front of the lower row 297 of first branch retention stations 294. The unprotected optical fibers extending from the lower branch cables 38' extend beneath the second branch retention stations 315. Accordingly, accidental contact between these optical fibers and a tool is mitigated. The unprotected optical fibers extending from the higher branch cables 38 that would be in range of a tool, however, are encased within a buffer tube as they extend by the second branch retention stations 315.

Figure 24:
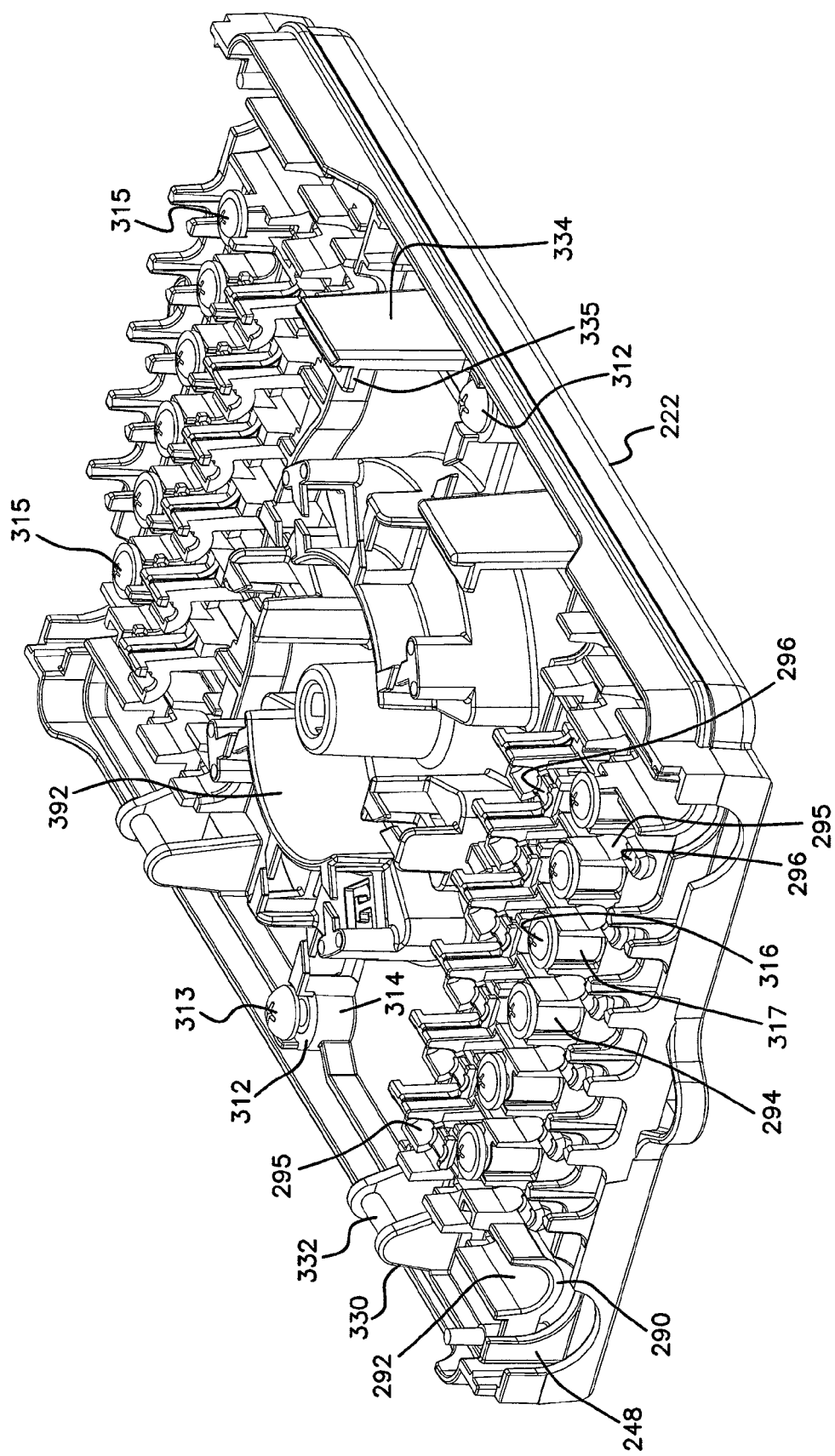
FIG. 24 is a top perspective view of a cable management tray installed on a base of the splice enclosure of FIG. 22 in accordance with the principles of the present disclosure.

In addition, the fiber management tray 248 can include a central spooling section 392 (see FIG. 24). The spooling section 392 includes opposing platform structures 393 and opposing stands 395 that extend upwardly from a base of the cable management tray 248. The platform structures 393 and stands 395 cooperate to define a curved upper spooling path 394 and a curved lower spooling path 396 (see FIG. 25). The upper spooling path 394 extends along a raised platform surface defined by the platform structures 393 and stands 395. The lower spooling path 396 extends along the base of the cable management tray 248 around the platform structures 393 and stands 395. The curvatures of the spooling paths 394, 396 assist in maintaining minimum bend radius requirements for fiber stored at the spooling section 392. The platform structures 393 and stands 395 also can define cross-paths 398 that extend crosswise through the central spooling structure. The cross-paths 398 facilitate changing a spooling direction of a fiber being routed around the central spool structure 392.

Figure 25:
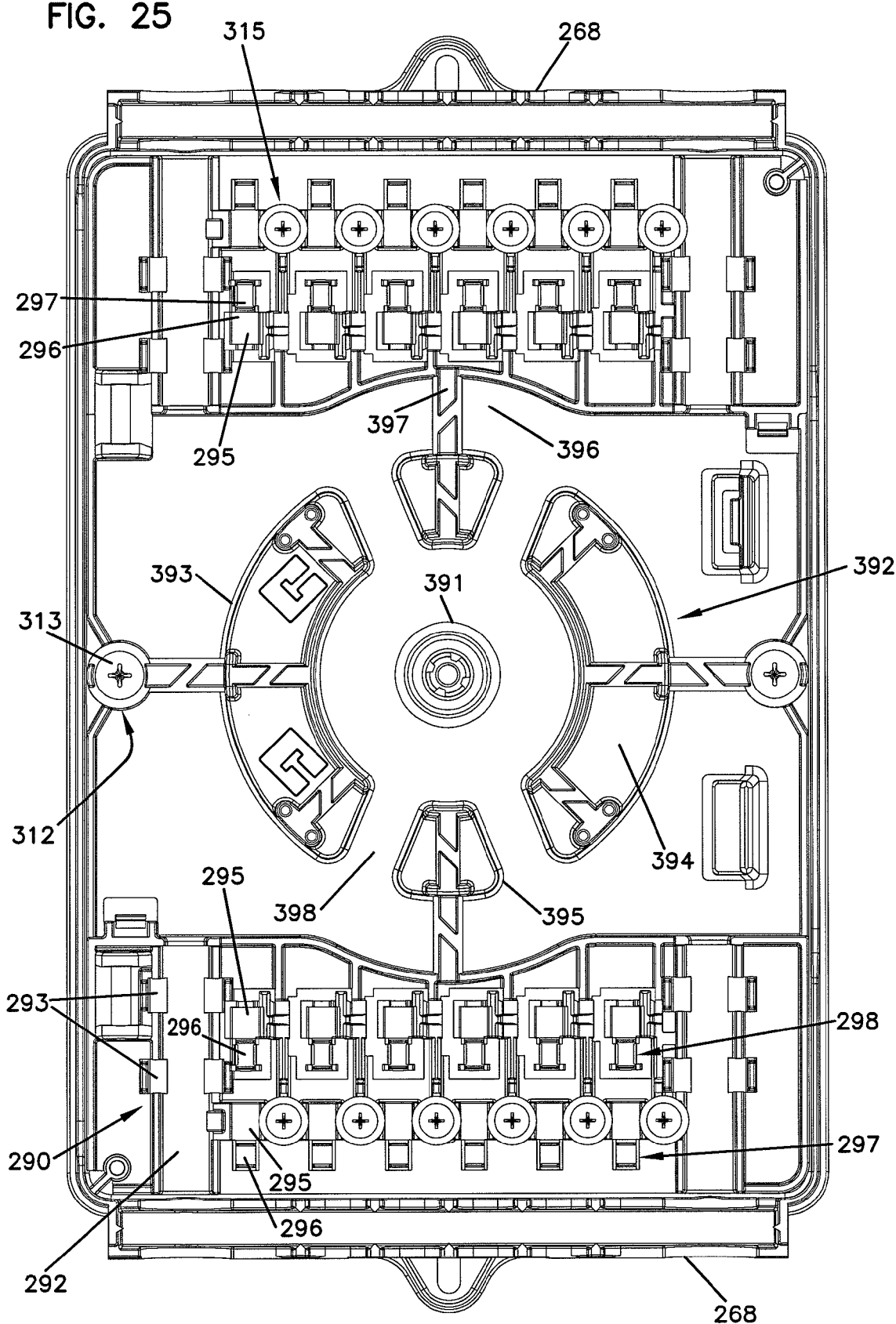
FIG. 25 is a plan view of the cable management tray of FIG. 24 in accordance with the principles of the present disclosure.

As shown at FIGS. 24 and 25, the fiber management tray 248 also includes a pair of standoffs 330 that extend upwardly from the base of the tray 248 at one side of the tray 248. The standoffs 330 are configured to enable the splice tray stack 246 to pivotally couple to the management tray 248. In the example shown, the standoffs 330 have hinge pins 332 at their free ends for pivotally receiving pivot linkages (see FIGS. 32-34) of the splice tray stack 246. The standoffs 330 assist in offsetting the splice tray stack 246 from the spooling section 392 of the fiber management tray 248. Seating structures 334 extend upwardly from the base of the tray 248 at the opposite side of the tray 248. The seating structures 334 define shoulders 335 on which a bottom of the splice stack 246 can seat to further aid in offsetting the splice tray stack 246 from the spooling section 392.

Example cable routing schemes are provided in FIGS. 26-29. An incoming portion of a trunk cable 40 is routed into the splice enclosure 220 at a first trunk retention station 290 at a first end 268 of the splice enclosure 220. An outgoing portion of the trunk cable 40 is routed out of the splice enclosure 220 at another first trunk retention station 290 provided at the opposite, second end 269 of the splice enclosure 220. In the example shown, the first trunk retention station 290 provided on the second end 269 aligns with the first trunk retention station 290 provided on the first end 268. In other embodiments, however, the outgoing portion of the trunk cable 40 can be routed out of the spice enclosure 220 at a different first trunk retention station 290, such as another first trunk retention station 290 provided on the first end 268 of the enclosure 220.

Figure 26:
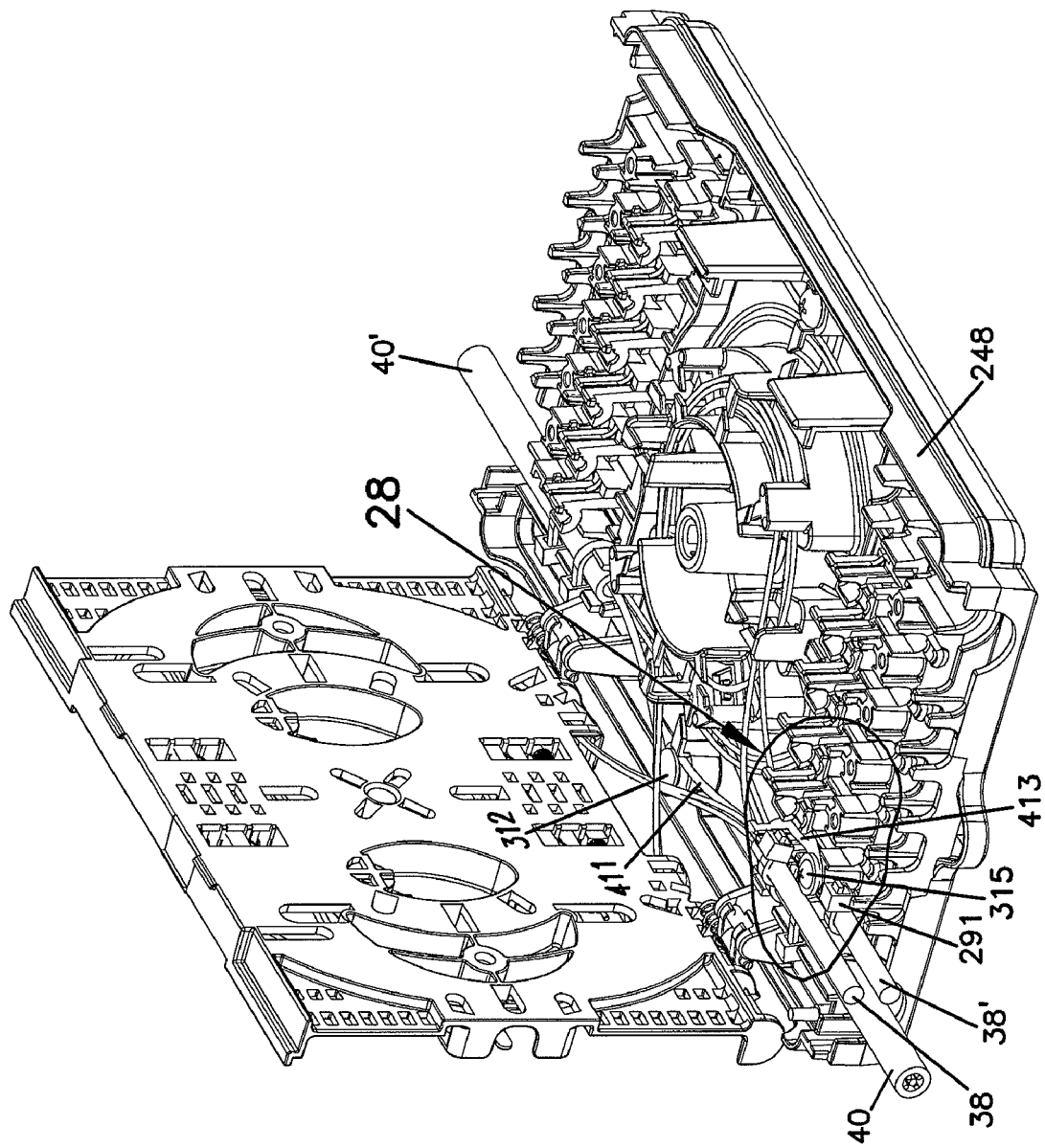
FIG. 26 is a front perspective view of the cable management tray of FIG. 24 with one trunk cable, two branch cables, and one splice tray mounted to the cable management tray in accordance with the principles of the present disclosure.
Figure 27:
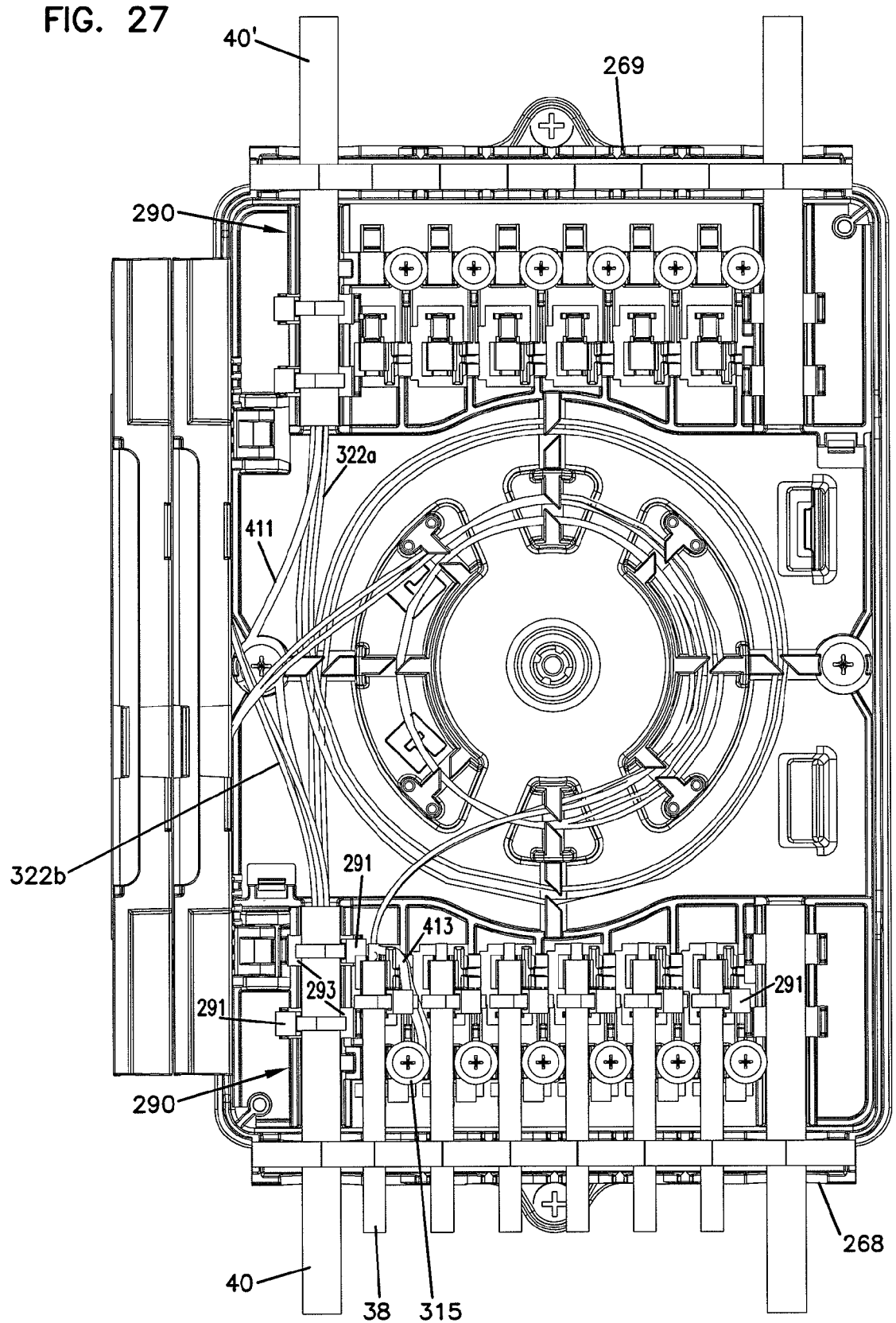
FIG. 27 is a plan view of the cable management tray of FIG. 26 in accordance with the principles of the present disclosure.

As shown in FIGS. 26 and 27, each of the trunk cable portions are seated in a cable cradle 292 and attached to the tray 248 at one or more mounting structures 293 at the respective first trunk retention stations 290. In the example shown, two cable ties 291 facilitate securing each trunk cable portion to the respective mounting structures 293. Strength members 411 of the trunk cable portions are routed to one or more second trunk retention locations 312. In the example shown in FIG. 27, the strength members 411 of the incoming and outgoing trunk cable portions are routed to the first trunk retention locations 312 that is positioned between the two second trunk retention stations 290.

Buffer tubes 322*a* corresponding to fibers not intended to be accessed can be routed from the incoming portion of the trunk cable 40, around the lower spooling path 396 of the central spooling section 392, to the outgoing portion of the trunk cable 40. Buffer tubes containing fibers to be accessed can be terminated adjacent the incoming portion of the trunk cable 40. The length of terminated fibers (e.g., about 1.5 meters) can be wrapped around the upper spooling path 294 until needed. When needed, terminated fibers can be routed from the fiber management tray 248 up to one of the splice trays of the splice tray stack 246.

Two branch cables 38 are installed on the splice enclosure 220 in FIG. 26. A first branch cable 38 enters the splice enclosure 220 at one first branch retention station 294 and a second branch cable 38' enters the splice enclosure 220 at another first branch retention station 290. In the example shown, the first branch cable 38 is routed to a second securement station 290 in the upper row 298 and the second branch cable 38' is routed to a second securement station 290 in the lower row 297. The first and second branch cables 38, 38' are secured to the respective cable cradles 295 at the respective mounting structure 296 with a cable tie 291. In the example shown in FIGS. 26 and 27, the strength members 413 of the two branch cable 38, 38' are secured to one second retention location 315. The strength members 413 are wrapped around a fastener 316 mounted to a hub 317.

Referring to FIGS. 30-43, the splice tray stack 46 includes one or more splice trays, such as splice trays 170 shown in FIGS. 30-43 or splice trays 170' shown in FIGS. 44-50. The splice tray stack 46 is configured to pivotally mount above the fiber management tray 48, 248 of the splice enclosure 20, 220 (see FIGS. 2 and 22). Typically, the splice tray stack 46 includes two to five splice trays 170 pivotally coupled to each other.

Figure 30:
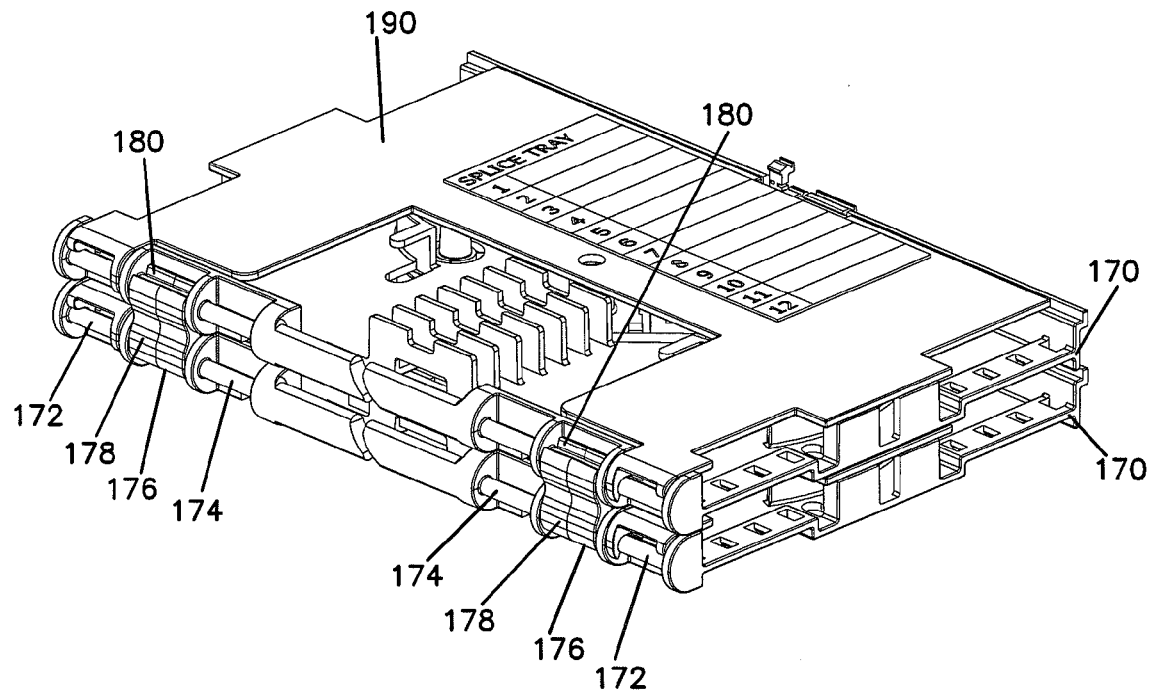
FIG. 30 is a first perspective view of a splice tray stack configured to be used in the fiber optic splice enclosure of FIG. 1 and/or the fiber optic splice enclosure of FIG. 21 in accordance with the principles of the present disclosure.
Figure 31:
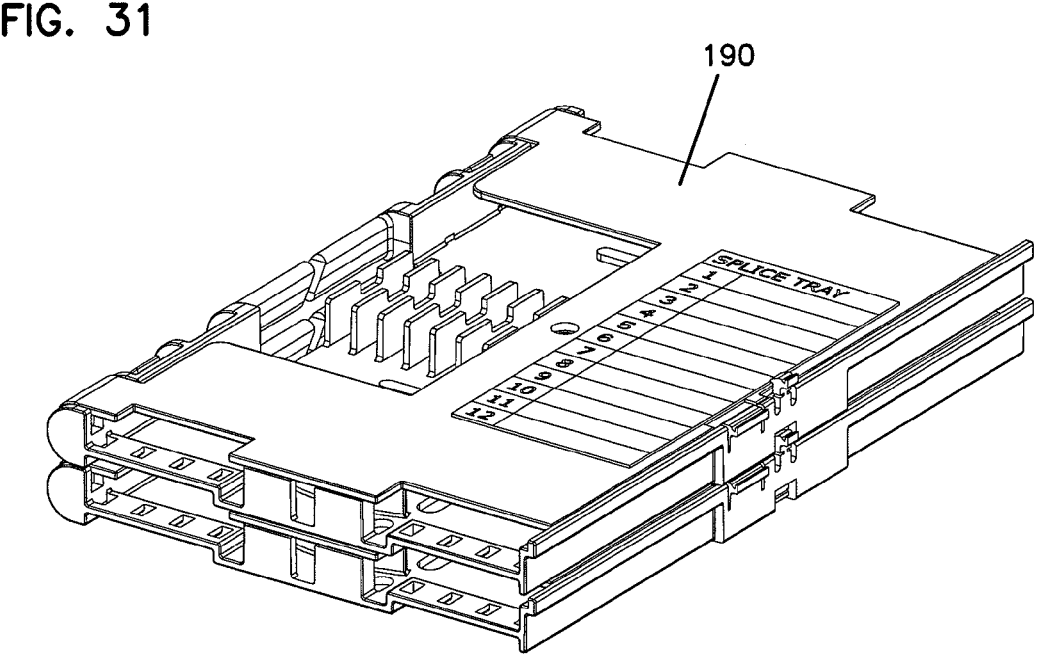
FIG. 31 is a second perspective view of the splice tray stack of FIG. 30 in accordance with the principles of the present disclosure.
Figure 32:
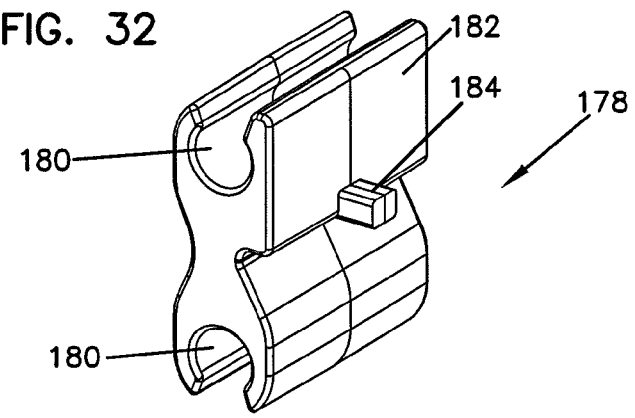
FIGS. 32-34 show various views of a hinge device used to pivotally interconnect the splice trays of the splice tray stack of FIG. 30 in accordance with the principles of the present disclosure.
Figure 33:
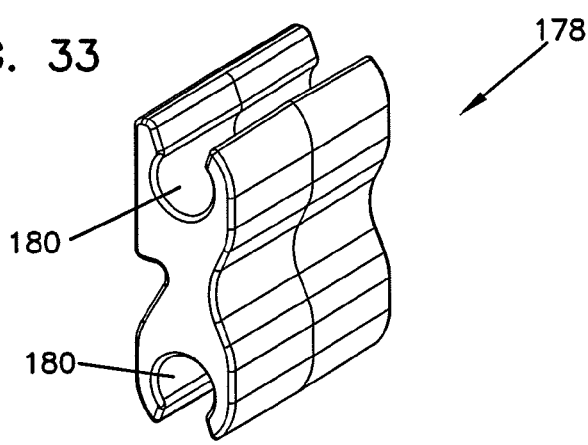
Figure 34:
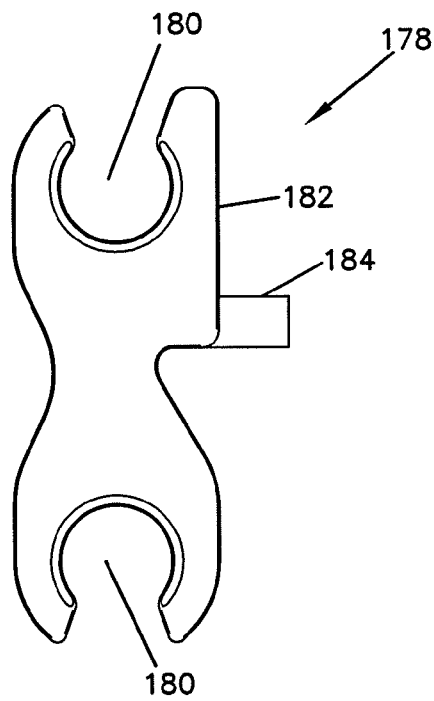
Figure 35:
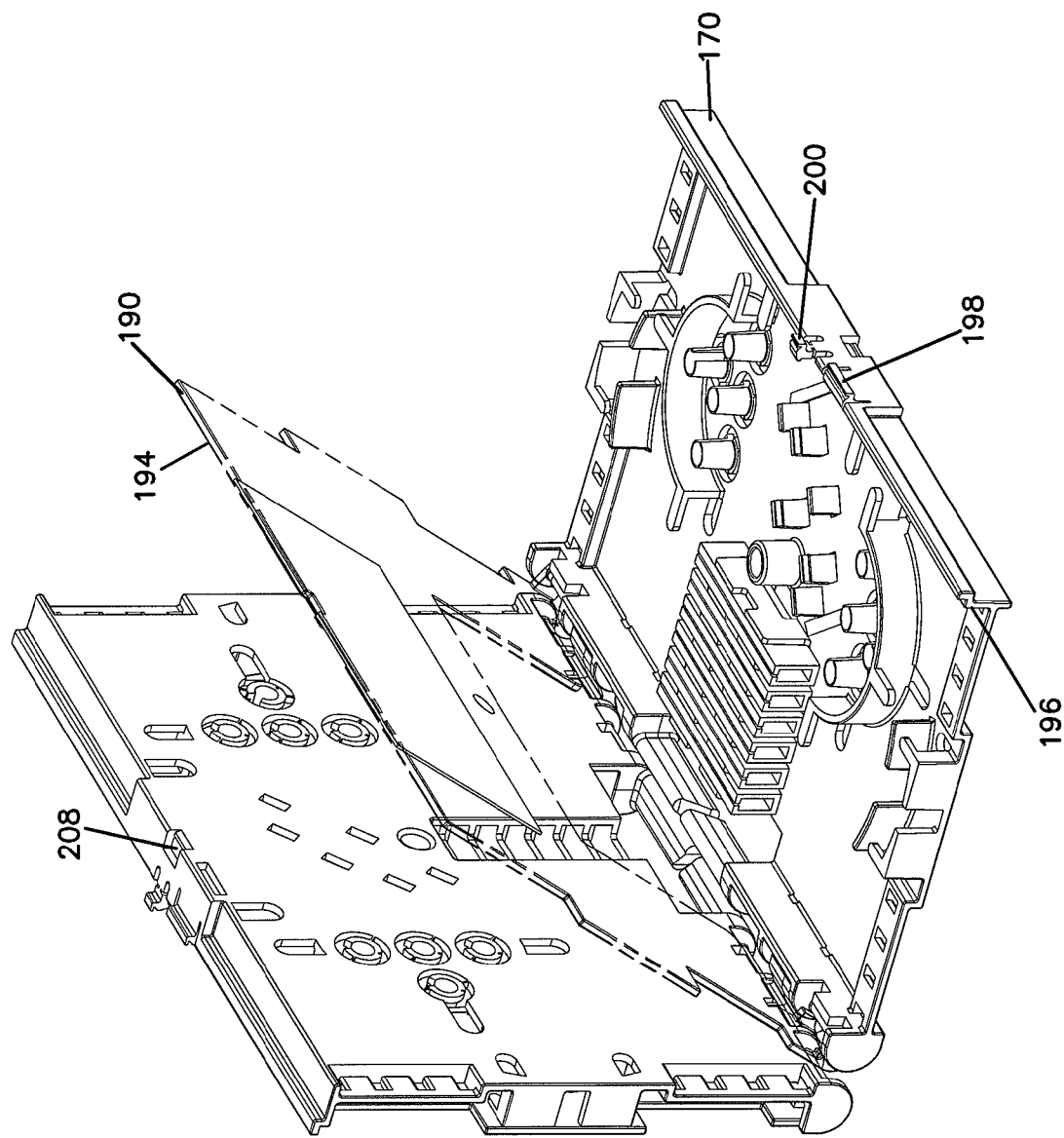
FIG. 35 shows the splice tray stack of FIG. 30 with one of the splice trays pivoted to an open position in accordance with the principles of the present disclosure.
Figure 36:
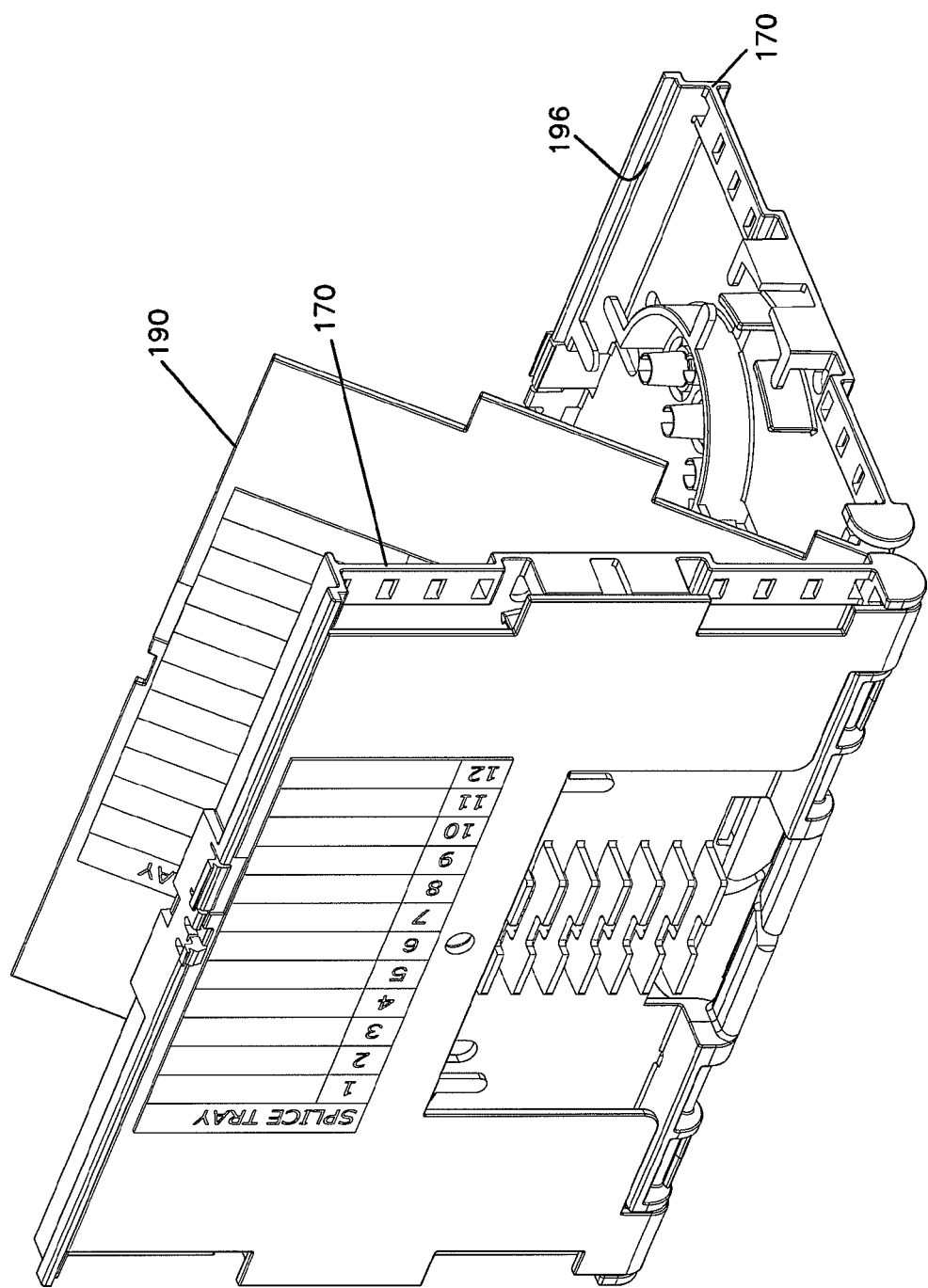
FIG. 36 is another perspective view of the splice tray stack of FIG. 30 with one of the splice trays pivoted to an open position in accordance with the principles of the present disclosure.
Figure 40:
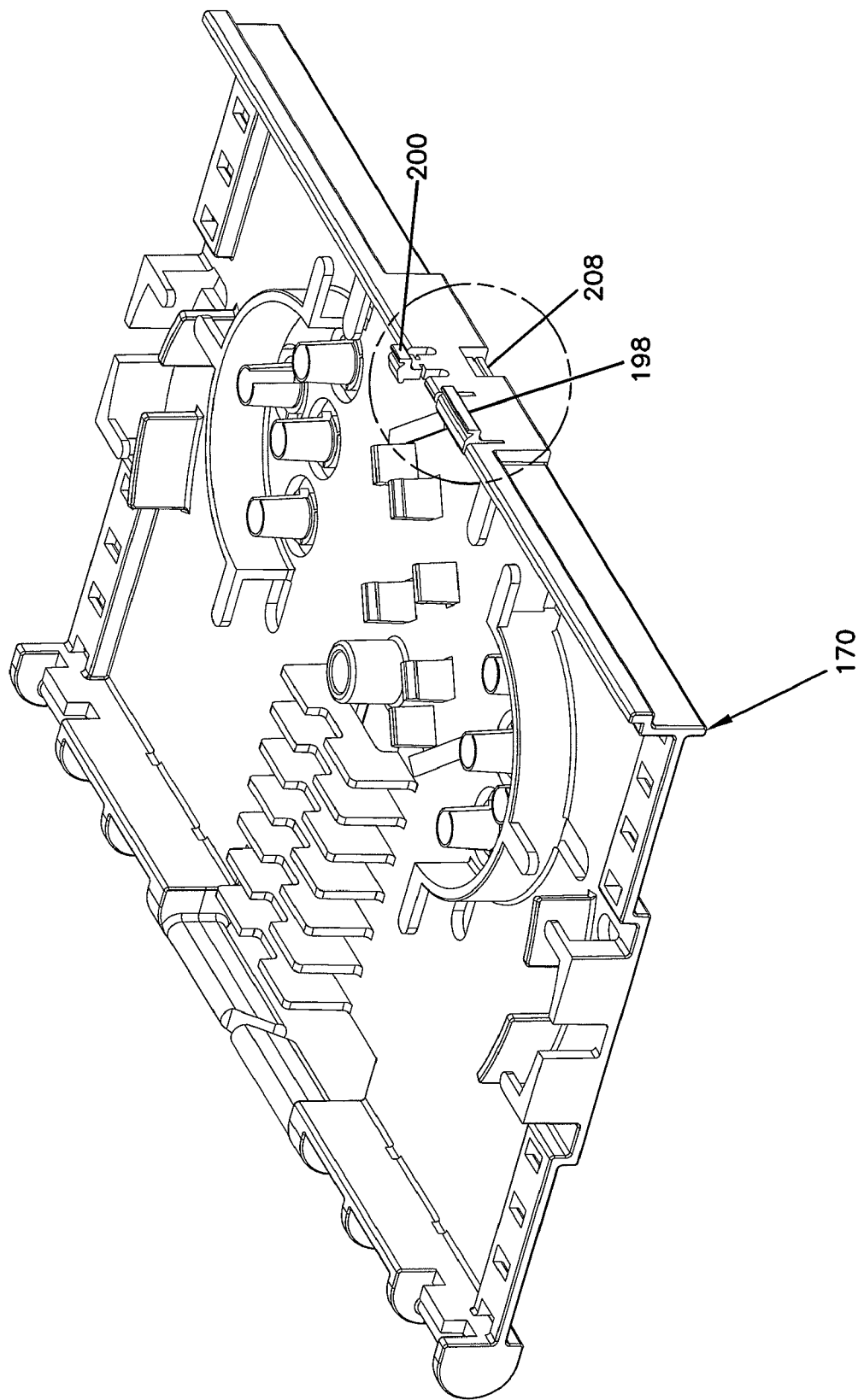
FIG. 40 is a perspective view of one of the splice trays of the splice tray stack of FIG. 30 in accordance with the principles of the present disclosure.
Figure 41:
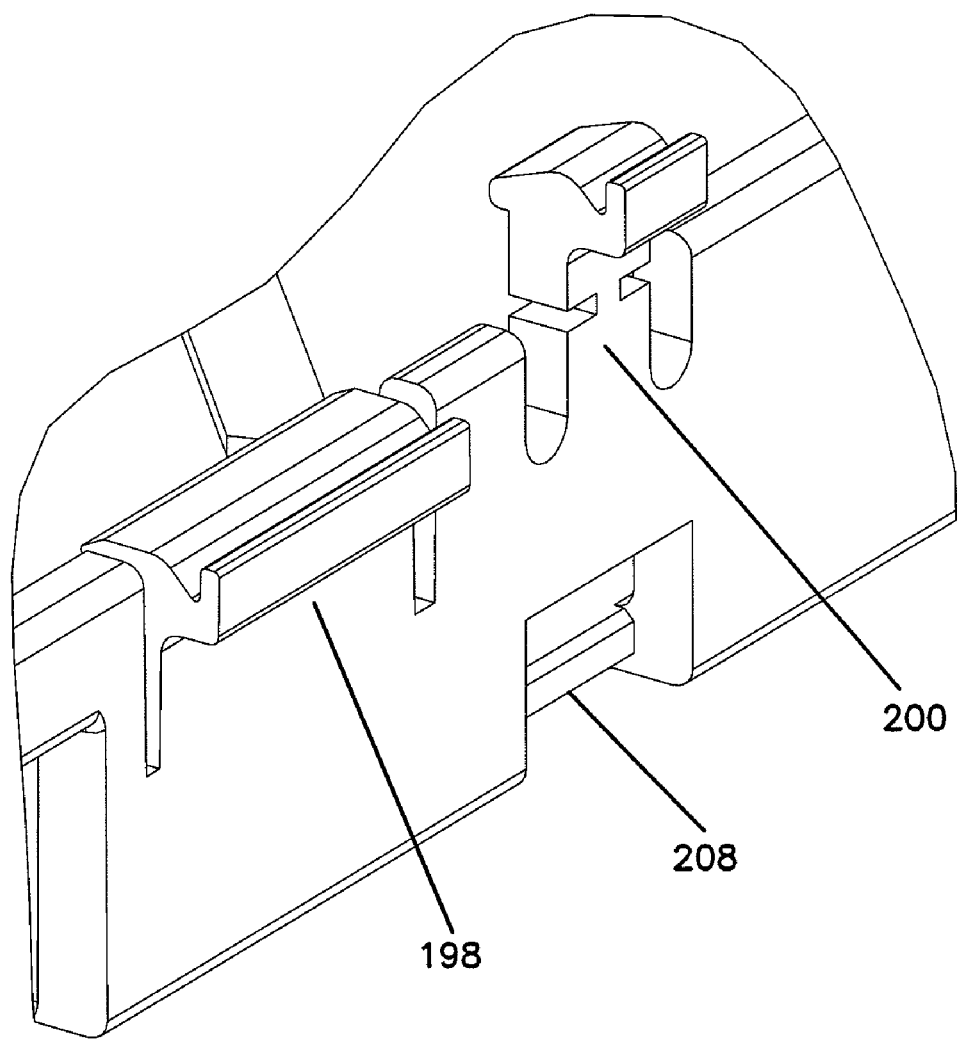
FIG. 41 is a detailed view of a portion of FIG. 40 in accordance with the principles of the present disclosure.

FIGS. 30-33 show one example splice tray stack 46 including two splice trays 170. As best shown at FIG. 30, each of the splice trays 170 includes an outer pair of hinge pins 172, an inner pair of hinge pins 174, and an intermediate pair of hinge pins 176. The two splice trays 170 are interconnected by a pair of pivot linkages 178 (see FIGS. 32-34). Each pivot linkage 178 includes two oppositely positioned snap-fit receptacles 180 that receive the intermediate hinge pins 176 of the splice trays 170 to join the splice trays 170 together. As shown at FIGS. 32-34, the pivot linkages 170 each include a flats 182 and stop 184. When the pivot linkages 178 are used to join the splice trays 170 together, the flats 182 and stops 184 engage the upper splice tray 170 to prevent the upper splice tray 170 from being able to pivot relative to the pivot linkages 178. However, the pivot linkages 178 can freely pivot relative to the intermediate hinge pins 176 of the lower splice tray 170. Therefore, when the upper splice tray 170 is pivoted to an open position relative to the lower splice tray 170 as shown at FIG. 35, this pivotal movement is accommodated by pivoting the pivot linkages 178 about the intermediate hinge pins 176 of the lower splice tray 170. Accordingly, the pivot linkages 178 allow the upper splice tray 170 to be pivoted to an open position relative to the lower splice tray 170. The pivot linkages 178 also function to hold the upper splice tray 170 in an upright position as shown at FIG. 35.

The splice tray stack 46 can be pivotally coupled to the fiber management tray 48, 248 to enable the entire splice tray stack 46 to be pivoted to an open position (see FIGS. 2 and 3) in which the fiber management tray 48, 248 can be readily accessed. In some embodiments, the splice tray stack 46 can be secured to the fiber management tray 48 by snapping the inner hinge pins 174 into the snap-fit receptacles 132 of the standoffs 130. The inner hinges pins 174 can pivot within the snap-fit receptacles 132 so that the entire splice tray stack 46 can be pivoted to an open position (see FIGS. 2 and 3) in which the fiber management tray 48, 248 can be readily accessed. In other embodiments, the splice tray stack 46 can be secured to the management ray 248 by snapping a pivot linkage 178 onto the hinge pins 332 of the standoffs 330 on the tray 248. The pivot linkage 178 pivots on the hinge pins 332 so that the entire splice tray stack 46 can be pivoted to an open position.

Each of the splice trays 170 has a pivotal cover 190 (see FIGS. 35-39). The covers 190 include snap-fit receptacles 192 that snap over the outer hinge pins 172 of the splice trays 170. A pivotal relationship exists between the snap-fit receptacles 192 and the outer hinge pins 172 such that the covers 190 can be pivoted relative to their corresponding splice trays 170 to provide access to interior regions of the splice trays 170. FIG. 35 shows the cover 190 of the lower splice tray 170 pivoted to an open position in which the lower splice tray 170 can be readily accessed.

When the covers 190 are moved to closed positions (as shown at FIGS. 30 and 31), outer portions 194 of the covers 190 engage recessed shoulders 196 of the splice trays 170 so that the covers 190 have a flush-mount configuration. Flexible cover latches 198 are provided on the splice trays 170 for retaining the covers 190 in the closed position. The lower splice tray 170 also includes a flexible tray latch 200 for retaining the upper splice tray in the closed position (see FIGS. 35, 40, and 41). The covers 190 have recesses 202 for receiving the cover latches 198, and notches 206 for providing clearance for the tray latches 200. The upper splice tray has a catch 208 that engages the tray latch 200 when the upper splice tray is in the closed orientation.

Figure 42:
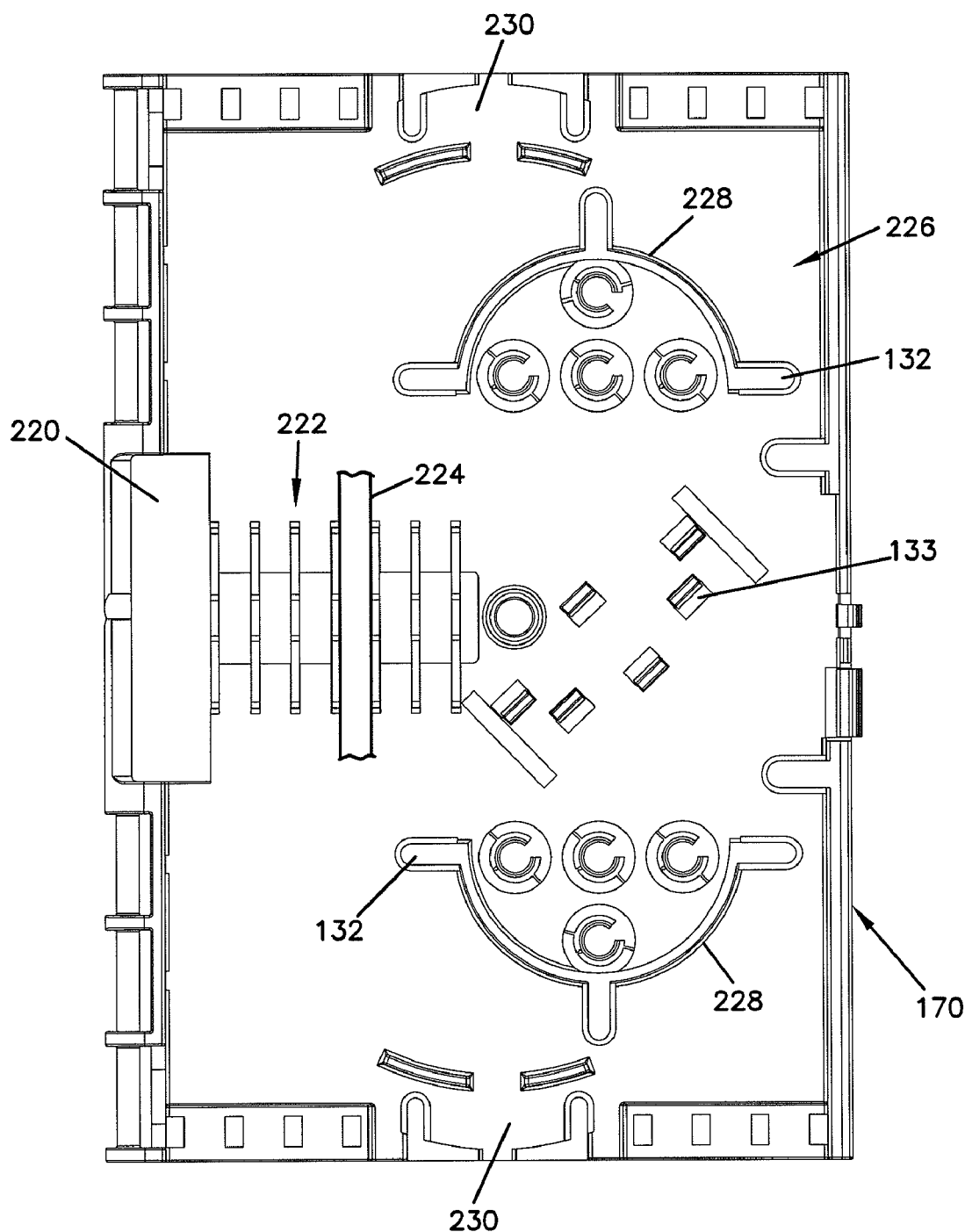
FIG. 42 is a top, plan view of the splice tray of FIG. 40 in accordance with the principles of the present disclosure.

Referring to FIG. 42, each of the splice trays 170 has a pass-through opening 220 for allowing fibers to be routed into the splice tray. A splice mounting location 222 is located adjacent to the pass through opening 220. The splice mounting location 222 is adapted to mount a plurality of splice sleeves 224. The splice tray 170 also includes a fiber storage region 226 including two spaced apart half spools 228 about which excess fiber can be spooled. Further excess fiber can also be looped around a fiber storage path that extends around the interior perimeter of the tray and includes outer channels 130. Cable management fingers 132 can be provided for holding the stored fiber within the trays. The trays 170 can also include splitter mounting locations 133 for mounting splitters within the splice trays.

Figure 43:
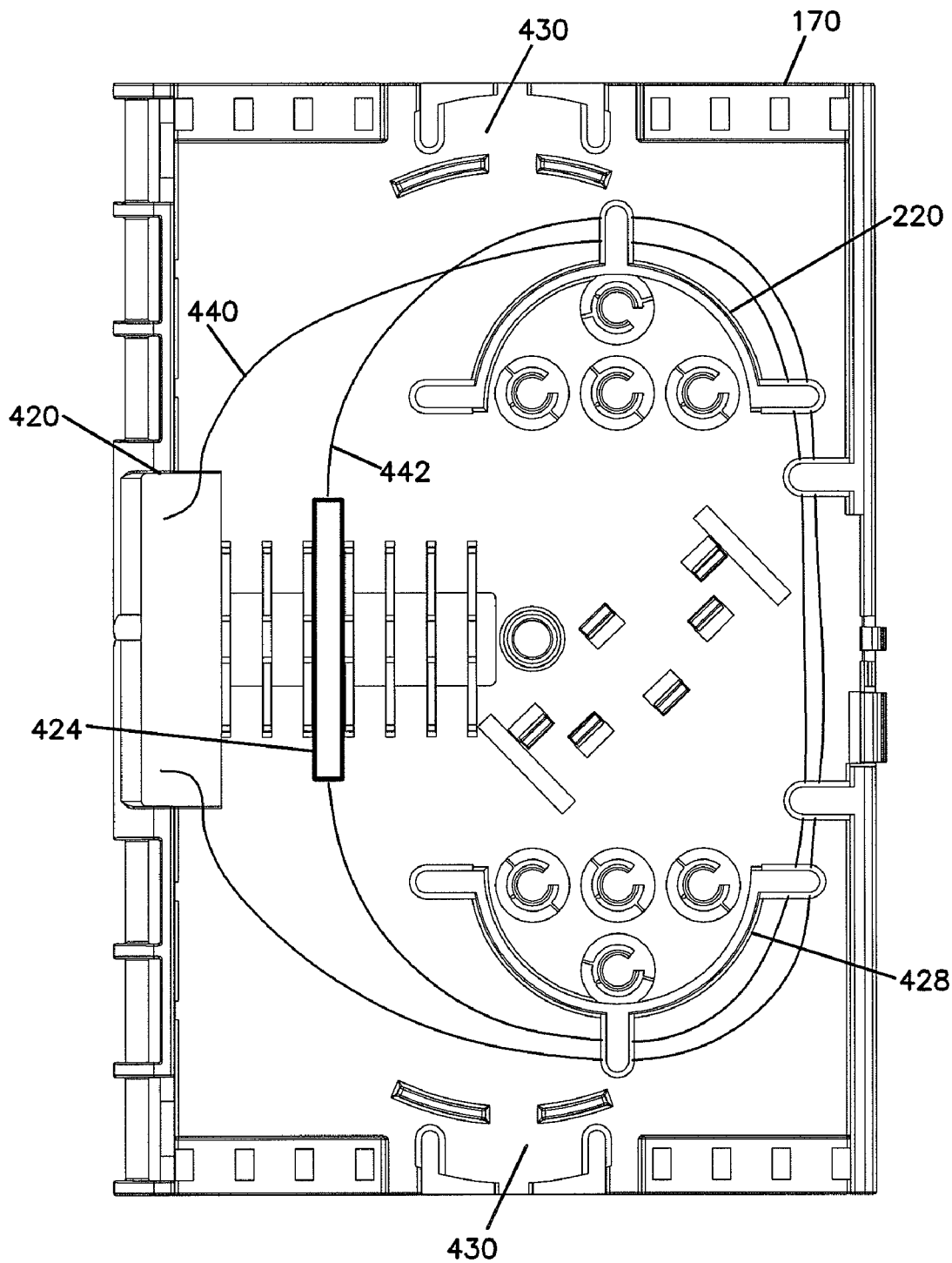
FIG. 43 shows a fiber routing layout for one of the splice trays in accordance with the principles of the present disclosure.

FIG. 43 shows an example fiber-routing layout for the splice tray. As shown at FIG. 43, a pre-terminated fiber 440 from the trunk cable 40 enters the splice tray 170 through the pass-through opening 420. The fiber 440 is typically either loose or tight buffered. Upon entering the splice tray 170, excess length of the fiber 440 can be looped around the half spools 428. The fiber 440 is then routed to the splice sleeve 424 where the fiber 440 is spliced to a fiber 442 corresponding to one of the drop cables 38. The fiber 442 is typically loose or tight buffered. From the splice sleeve 424 the fiber 442 can be routed around the half spools 428 and then back to the fiber management tray 48, 248 through the pass-through opening 420. For certain applications, excess fiber can also be routed through the outer channels 430 of the splice tray. Further, excess length of the fiber 442 can also be stored at the spooling section of the fiber management tray 48, 248.

The above specification provides examples of how certain aspects may be put into practice. It will be appreciated that the aspects can be practiced in other ways than those specifically shown and described herein without departing from the spirit and scope of the disclosure.

What is claimed is:

1. A method for routing a branch cable through a branch cable port into a splice enclosure having first and second branch retention stations and a reversal post adjacent the first branch retention station, wherein the second branch retention station is positioned nearer the branch cable port than the first branch retention station, the branch cable including at least one optical fiber surrounded by a cable jacket and strength members, the method comprising:
   routing a first branch cable in a first direction through a first branch cable port into the splice enclosure;
   securing the cable jacket of the first branch cable to the first branch retention station;
   grouping the strength members of the first branch cable and routing the grouped strength members around the reversal post;
   routing the strength members in a second direction from the reversal post to the second branch retention station, the second direction being generally opposite from the first direction; and
   securing the strength members of the first branch cable to the second branch retention station.

2. The method of claim 1, wherein securing the cable jacket comprises securing the cable jacket to a mounting structure of the first branch retention station with a cable-tie.

3. The method of claim 1, wherein securing the strength members comprises securing the strength members to a hub with a fastener.

4. A splice enclosure comprising:
   an enclosure structure defining a port for receiving a cable;
   a cable jacket tie-down arrangement positioned within the enclosure structure and offset a first distance from the port;
   a cable strength member anchoring arrangement positioned within the enclosure structure and offset a second distance from the port; and
   a strength member reversal post about which cable strength members are routed prior to being secured to the cable strength member anchoring arrangement, the reversal post positioned within the enclosure structure and offset a third distance from the port, wherein the second distance is shorter than the third distance.

5. The splice enclosure of claim 4, wherein the second distance is shorter than the first distance.

6. The splice enclosure of claim 4, wherein the first distance is shorter than the second distance.

* * * * *